United States Patent
Khosravy et al.

(10) Patent No.: US 10,728,706 B2
(45) Date of Patent: *Jul. 28, 2020

(54) PREDICTIVE SERVICES FOR DEVICES SUPPORTING DYNAMIC DIRECTION INFORMATION

(71) Applicant: MICROSOFT TECHNOLOGY LICENSING, LLC, Redmond, WA (US)

(72) Inventors: Moe Khosravy, Bellevue, WA (US); Lev Novik, Bellevue, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/107,753

(22) Filed: Aug. 21, 2018

(65) Prior Publication Data

US 2018/0359607 A1 Dec. 13, 2018

Related U.S. Application Data

(63) Continuation of application No. 14/934,008, filed on Nov. 5, 2015, now Pat. No. 10,057,724, which is a continuation of application No. 12/476,417, filed on Jun. 2, 2009, now Pat. No. 9,200,901.

(60) Provisional application No. 61/074,415, filed on Jun. 20, 2008, provisional application No. 61/074,590, filed on Jun. 20, 2008, provisional application No. 61/073,849, filed on Jun. 19, 2008.

(51) Int. Cl.
| | | |
|---|---|---|
| *G01C 21/12* | (2006.01) | |
| *H04W 4/02* | (2018.01) | |
| *G06Q 30/02* | (2012.01) | |
| *G01C 21/20* | (2006.01) | |
| *H04L 29/08* | (2006.01) | |
| *H04W 4/029* | (2018.01) | |
| *G01C 21/00* | (2006.01) | |
| *G01C 21/36* | (2006.01) | |

(52) U.S. Cl.
CPC ............ *H04W 4/026* (2013.01); *G01C 21/00* (2013.01); *G01C 21/20* (2013.01); *G06Q 30/0241* (2013.01); *H04L 67/18* (2013.01); *H04W 4/029* (2018.02); *G01C 21/3664* (2013.01)

(58) Field of Classification Search
CPC .............................. G06Q 30/02; G01C 21/26
USPC ......................................... 705/14.4; 701/400
See application file for complete search history.

(56) References Cited

U.S. PATENT DOCUMENTS

| | | | |
|---|---|---|---|
| 7,092,964 B1 * | 8/2006 | Dougherty | G06Q 30/02 707/999.003 |
| 7,441,203 B2 | 10/2008 | Othmer et al. | |
| 7,920,072 B2 | 4/2011 | Smith et al. | |
| 8,098,894 B2 | 1/2012 | Soderstrom | |
| 8,467,991 B2 | 6/2013 | Khosravy et al. | |

(Continued)

OTHER PUBLICATIONS

"Final Office Action Issued in U.S. Appl. No. 15/596,959", dated May 14, 2019, 17 Pages. (MS# 327080-US-CNT[2]).

(Continued)

*Primary Examiner* — Sun M Li

(74) *Attorney, Agent, or Firm* — Workman Nydegger

(57) ABSTRACT

POIs and content for POIs can be predicted for users based on a variety of factors, such as an analysis of their present path and directional changes, rates of changes, speed or other factors.

17 Claims, 24 Drawing Sheets

(56) References Cited

U.S. PATENT DOCUMENTS

| | | |
|---|---|---|
| 8,872,767 B2 | 10/2014 | Khosravy et al. |
| 9,661,468 B2 | 5/2017 | Khosravy et al. |
| 2002/0059266 A1 | 5/2002 | I'anson et al. |
| 2002/0080167 A1 | 6/2002 | Andrews et al. |
| 2002/0165771 A1 | 11/2002 | Walker et al. |
| 2003/0100315 A1 | 5/2003 | Rankin |
| 2003/0101059 A1 | 5/2003 | Heyman |
| 2004/0064245 A1* | 4/2004 | Knockeart ......... G01C 21/3415 701/414 |
| 2004/0214550 A1 | 10/2004 | Jenkins |
| 2004/0260464 A1 | 12/2004 | Wong |
| 2005/0212760 A1 | 9/2005 | Marvit et al. |
| 2005/0243061 A1 | 11/2005 | Liberty et al. |
| 2006/0004914 A1 | 1/2006 | Kelly et al. |
| 2006/0015489 A1 | 1/2006 | Probst et al. |
| 2006/0158310 A1 | 7/2006 | Klatsmanyi et al. |
| 2006/0229807 A1 | 10/2006 | Sheha et al. |
| 2006/0253392 A1 | 11/2006 | Davies |
| 2007/0110338 A1 | 5/2007 | Snavely et al. |
| 2007/0150444 A1 | 6/2007 | Chesnais et al. |
| 2008/0059578 A1 | 3/2008 | Albertson et al. |
| 2008/0228429 A1 | 9/2008 | Huang et al. |
| 2010/0156812 A1 | 6/2010 | Stallings et al. |
| 2010/0205628 A1 | 8/2010 | Davis et al. |
| 2010/0289665 A1 | 11/2010 | Dickie et al. |
| 2011/0006977 A1 | 1/2011 | Khosravy et al. |
| 2017/0249748 A1 | 8/2017 | Khosravy et al. |
| 2017/0269703 A1 | 9/2017 | Khosravy et al. |

OTHER PUBLICATIONS

"Non Final Office Action Issued in U.S. Appl. No. 15/617,248", dated Aug. 2, 2019, 6 Pages. (MS# 327084-US-CNT[3]).

"Non Final Office Action Issued in U.S. Appl. No. 12/400,087", dated Mar. 21, 2019, 23 Pages. (MS# 326586-US-NP).

"Non Final Office Action Issued in U.S. Appl. No. 12/364,936", dated Nov. 2, 2018, 22 Pages.

"Non Final Office Action Issued in U.S. Appl. No. 12/400,087", dated Sep. 6, 2018, 34 Pages.

"Non Final Office Action Issued in U.S. Appl. No. 15/596,959", dated Oct. 26, 2018, 14 Pages.

"Office Action Issued in Chinese Patent Application No. 201080011811.1", dated Aug. 29, 2013, 14 Pages.

"International Search Report and Written Opinion Issued in PCT Application No. PCT/US2010/025684", dated Sep. 28, 2010, 9 Pages.

"Final Office Action Issued in U.S. Appl. No. 15/596,959", dated Feb. 19, 2020, 23 Pages. (MS# 327080-US-CNT[2]).

"Non Final Office Action Issued in U.S. Appl. No. 15/596,959", dated Nov. 15, 2019, 19 Pages. (MS# 327080-US-CNT[2]).

* cited by examiner

Determine Object at which Mobile Device is Pointed based on Location (e.g., GPS) and Motion Vector (e.g., Compass, Accelerometer, etc.)

PREDICTIVE SERVICES FOR DEVICES SUPPORTING DYNAMIC DIRECTION INFORMATION

CROSS-REFERENCE TO RELATED APPLICATIONS

This application is a continuation of U.S. patent application Ser. No. 14/934,008, filed on Nov. 5, 2015, entitled "PREDICTIVE SERVICES FOR DEVICES SUPPORTING DYNAMIC DIRECTION INFORMATION", which issued as U.S. Pat. No. 10,057,724 on Aug. 21, 2018, which is a continuation of U.S. application Ser. No. 12/476,417 filed on Jun. 2, 2009, entitled "PREDICTIVE SERVICES FOR DEVICES SUPPORTING DYNAMIC DIRECTION INFORMATION," which issued as U.S. Pat. No. 9,200,901 on Dec. 1, 2015, which claims the benefit of and priority to U.S. Provisional Application Ser. No. 61/074,590, filed on Jun. 20, 2008, entitled "MOBILE COMPUTING SERVICES BASED ON DEVICES WITH DYNAMIC DIRECTION INFORMATION," U.S. Provisional Application Ser. No. 61/074,415, filed on Jun. 20, 2008, entitled "MOBILE COMPUTING SERVICES BASED ON DEVICES WITH DYNAMIC DIRECTION INFORMATION," and U.S. Provisional Application Ser. No. 61/073,849, filed on Jun. 19, 2008, entitled "MOBILE COMPUTING DEVICES, ARCHITECTURE AND USER INTERFACES BASED ON DYNAMIC DIRECTION INFORMATION," all of which are incorporated herein by reference in their entireties.

TECHNICAL FIELD

The subject disclosure relates to the provision of direction-based services for a device based on direction information and/or other information, such as location information, and to predictive services that predict content in advance for more efficient direction-based services.

BACKGROUND

By way of background concerning some conventional systems, mobile devices, such as portable laptops, PDAs, mobile phones, navigation devices, and the like have been equipped with location based services, such as global positioning system (GPS) systems, WiFi, cell tower triangulation, etc. that can determine and record a position of mobile devices. For instance, GPS systems use triangulation of signals received from various satellites placed in orbit around Earth to determine device position. A variety of map-based services have emerged from the inclusion of such location based systems that help users of these devices to be found on a map and to facilitate point to point navigation in real-time and search for locations near a point on a map.

However, such navigation and search scenarios are currently limited to displaying relatively static information about endpoints and navigation routes. While some of these devices with location based navigation or search capabilities allow update of the bulk data representing endpoint information via a network, e.g., when connected to a networked portable computer (PC) or laptop, such data again becomes fixed in time. Accordingly, it would be desirable to provide a set of richer experiences for users than conventional experiences predicated on location and conventional processing of static bulk data representing potential endpoints of interest.

Moreover, with conventional navigation systems, a user may wish to request information about a particular point of interest (POI), but if the user is moving quickly (e.g., in a car), the user may already be past the POI by the time the data about the POI becomes available. The user experience suffers as a result since users cannot interact with the desired information in relational or temporal proximity to the desire, e.g., due to delays in retrieving the desired information.

The above-described deficiencies of today's location based systems and devices are merely intended to provide an overview of some of the problems of conventional systems, and are not intended to be exhaustive. Other problems with the state of the art and corresponding benefits of some of the various non-limiting embodiments may become further apparent upon review of the following detailed description.

SUMMARY

A simplified summary is provided herein to help enable a basic or general understanding of various aspects of exemplary, non-limiting embodiments that follow in the more detailed description and the accompanying drawings. This summary is not intended, however, as an extensive or exhaustive overview. Instead, the sole purpose of this summary is to present some concepts related to some exemplary non-limiting embodiments in a simplified form as a prelude to the more detailed description of the various embodiments that follow.

Direction based pointing services are provided for portable devices or mobile endpoints. Mobile endpoints can include a positional component for receiving positional information as a function of a location of the portable electronic device, a directional component that outputs direction information as a function of an orientation of the portable electronic device and a processing engine that processes the positional information and the direction information to determine a subset of points of interest relative to the portable electronic device as a function of the positional information and/or the direction information.

Devices or endpoints can include compass(es), e.g., magnetic or gyroscopic, to determine a direction and location based systems for determining location, e.g., GPS. To supplement the positional information and/or the direction information, devices or endpoints can also include component(s) for determining speed and/or acceleration information for processing by the engine, e.g., to aid in the determination of gestures made with the device.

With the addition of directional information in the environment, a variety of service(s) can be provided on top of user identification or interaction with specific object(s) of interest. For instance, POIs and content for POIs can be predicted for users based on a variety of factors, such as an analysis of their present path and directional changes, rates of changes, or other factors, such that there is no noticeable, or minimal, latency between information being available with respect to such POIs and a request made via the user's device for such POI information.

Various embodiments include determining direction information as a function of a direction for the device and position information as a function of a position for the device. Using at least the direction and position information, a set of points of interest are predicted for future interaction. Then, information for at least a subset of the predicted points of interest is downloaded to or otherwise received in a local memory of the device based on probability of future interaction so that the information for the future interaction is already available from the local memory.

These and other embodiments are described in more detail below.

BRIEF DESCRIPTION OF THE DRAWINGS

Various non-limiting embodiments are further described with reference to the accompanying drawings in which.

DETAILED DESCRIPTION

Overview

Figure 1:
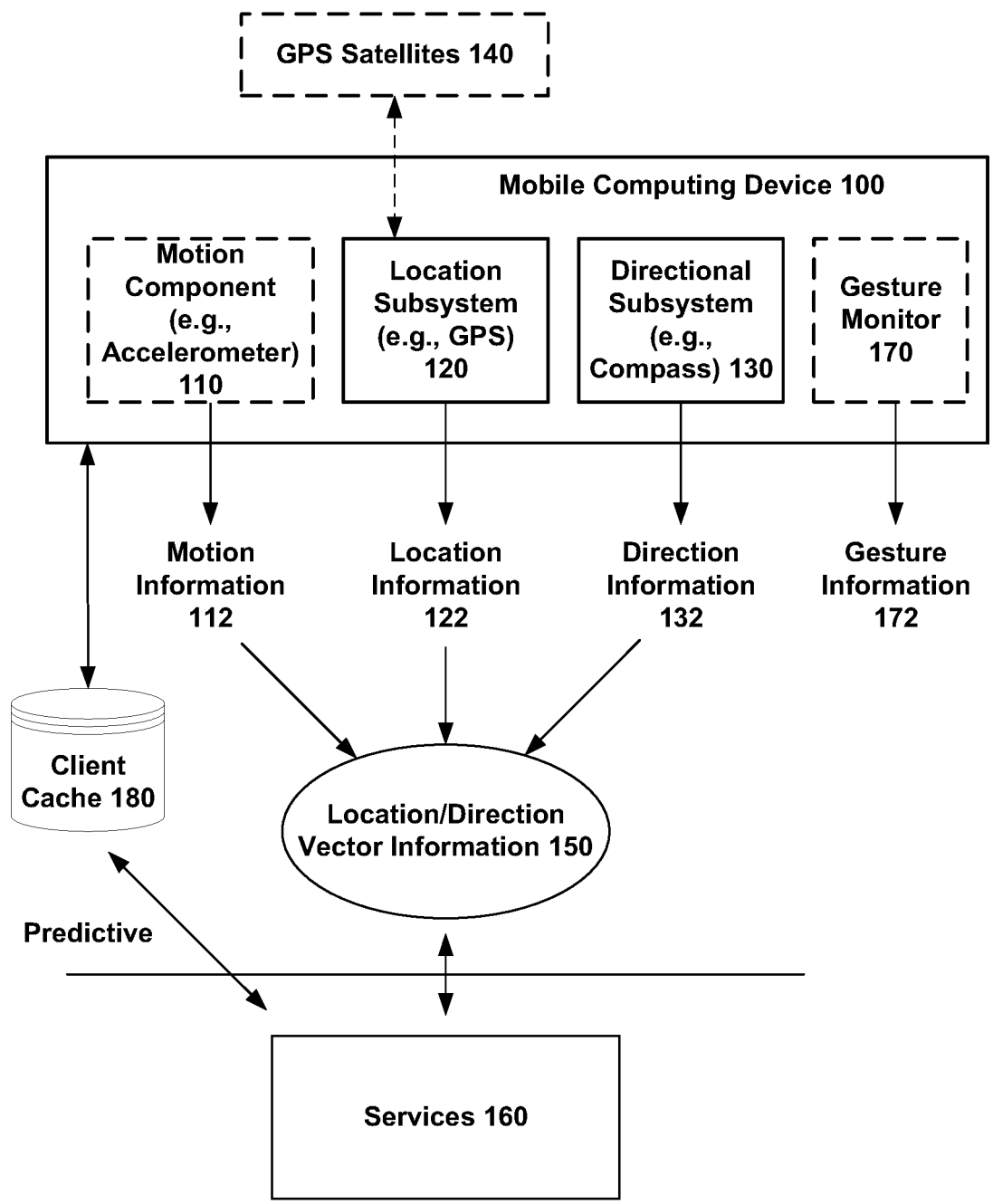
FIG. 1 illustrates a block diagram of a non-limiting device architecture for predictive pointing based services.

Among other things, current location services systems and services, e.g., GPS, cell triangulation, P2P location service, such as Bluetooth, WiFi, etc., tend to be based on the location of the device only, and tend to provide static experiences that are not tailored to a user because the data about endpoints of interest is relatively static, or fixed in time. Another problem is that a user may wish to interact with a particular point of interest (POI) via a user device in real-time, which conventionally requires a fast network exchange, which is not always available or possible.

However, if a network exchange relating to one or more POIs that are predicted to be within proximity soon or otherwise in the future can be anticipated, information about or content relating to such exchange can be predictively downloaded to the user device ready for such POI interaction. Such prediction can be predicated on different factors alone or in combination, such as data about the user, e.g., what the user likes and does not like, data about a path the user is taking or likely to take, an application being executed by the device, and so on. For instance, if a real estate application is being executed, then real estate POI information can be predictively downloaded to the device. In this way, even if the user is moving quickly, information about passing POIs is nonetheless made available at the device instantly, e.g., because it has already been placed in fast access memory, such as cache memory, based on where the user is expected to be, in what the user is expected to be interested, etc. The user experience is thus substantially improved since users can interact with POI information immediately when in proximity to the corresponding POIs.

At least partly in consideration of these deficiencies of conventional location based services, various embodiments of a portable device are provided that use direction information, position information and/or motion information to predict content for POIs that a device is likely to encounter or with which the device is likely to interact. A way to interact with POIs is thus provided via a device having access to direction information about a direction of the device, position information about a position of the device and optional motion information, wherein based on the information, the device intelligently pre-fetches content regarding POIs based on what is likely to be of interest to the user, e.g., based on speed, path history, present path, preferences, context, time, or other filtering characteristics. A variety of real-time scenarios are explored where predictive caching achieves efficient user experiences in the system. Accordingly, based on one or more of direction, position or motion information, a device predicts content for delivery regarding POIs so that the content is readied when the user arrives at the POIs.

While each of the various embodiments herein are presented independently, e.g., as part of the sequence of respective Figures, one can appreciate that a portable device and/or associated network services, as described, can incorporate or combine two or more of any of the embodiments. Given that each of the various embodiments improve the overall services ecosystem in which users wish to operate, together a synergy results from combining different benefits. Accordingly, the combination of different embodiments described below shall be considered herein to represent a host of further alternate embodiments.

A non-limiting device provisioned for direction based services can include an engine for analyzing location information (e.g., GPS, cell phone triangulation, etc.), direction information such as compass information (e.g., North, West, South, East, up, down, etc.), and optionally movement information (e.g., accelerometer information) to allow a platform for pointing to and thereby finding objects of interest in a user's environment. A variety of scenarios are contemplated based on a user finding information of interest about objects of interests, such as restaurants, or other items around an individual, or persons, places or events of interest nearby a user and tailoring information to that user (e.g., coupons, advertisements), however such information is of no use if it is not available at the time of user need.

In one embodiment, a method for displaying point of interest information on a mobile device is provided. Direction information and position information are determined as a function of a direction and position for the device, respectively. A set of points of interest for future interaction are predicted based on the direction information and the position information. In this manner, the device can pre-fetch point of interest information into a local memory for at least a subset of the points of interest of the set based on a probability of a future interaction with at least the subset of the points of interest. Motion information measured as a function of movement of the device can also be included in the predicting.

To pre-fetch information, identifiers associated with the points of interest of the set can be sent to a network service enabling information about the points of interest to be received in the local memory. The predicting can include receiving explicit input with respect to one or more POIs to be included in the set. The predicting can also include receiving at least one of a gesture input, a keyword input, an audio input, a video camera input or a touchscreen input with respect to one or more POIs to be included in the set. The predicting can also include receiving implicit input with respect to the one or more POIs to be included in the set.

In another embodiment, a portable electronic device is provided including a memory storing at least information related to at least one point of interest, a positional component for receiving position information as a function of a location of the portable electronic device, a directional component that outputs direction information as a function of an orientation of the portable electronic device, and at least one processor configured to process the position information and the direction information to determine at least one identifier of at least one point of interest within a predicted scope of the device, to pre-fetch advertisement information corresponding to the at least one identifier of the at least one point of interest, and to display the pre-fetched advertisement information if the device interacts with the at least one point of interest with the device.

The device can include a pointer that visually indicates the orientation of the portable electronic device based upon which the directional component outputs the direction information. The device can include an audio device for rendering audio content of the advertisement information if a condition upon which the predicted interaction is predicated occurs. The directional component can be a digital compass that outputs the direction information.

In another non-limiting embodiment, a method for displaying point of interest information on a mobile device comprises determining direction information based on an orientation for the device, determining position information as a function of a position for the device, identifying a region of real space that the device is unlikely to encounter in the future based on the direction information and the position information, and aging out, from a local cache of the device, point of interest information for a set of points of interest in the region that the device is unlikely to encounter. Motion information can also be factored into which points of interest to age out.

Details of various other exemplary, non-limiting embodiments are provided below.

Predictive Services for Devices Supporting Dynamic Direction Information

In this regard, users can interact with the endpoints in a host of context sensitive ways to provide or update information associated with endpoints of interest, or to receive beneficial information or instruments (e.g., coupons, offers, etc.) from entities associated with the endpoints of interest, and any of such actions can be facilitated by pre-fetched information, content, advertising, etc. that can relate to POIs with which the user is predicted to interact in the future. In one embodiment, information is predictively stored/updated in a local cache as the user/device moves, so that information about endpoints of potential interest to a user's present position and path is already available on the device by the time the user requests the information.

For instance, FIG. 1 illustrates a mobile computing device 100 according to an embodiment. In this regard, a set of services 160 can be built based on location information 122 and direction information 132 collected by the phone. For instance, location information 122 can be recorded by a location subsystem 120 such as a GPS subsystem communicating with GPS satellites 140. Direction or pointing information 132 can be collected by a direction subsystem 130, such as a compass, e.g., gyroscopic, magnetic, digital compass, etc. In addition, optionally, movement information 112 can be gathered by the device 100, e.g., via tower triangulation algorithms, and/or acceleration of the device 100 can be measured as well, e.g., with an accelerometer. The collective information 150 can be used to gain a sense of not only where the device 100 is located in relation to other potential points of interest tracked or known by the overall set of services 160, but also what direction the user is pointing the device 100, so that the services 160 can appreciate at whom or what the user is pointing the device 100.

In addition, a gesture subsystem 170 can optionally be included, which can be predicated on any one or more of the motion information 112, location information 122 or direction information 132. In this regard, not only can direction information 132 and location information 122 be used to define a set of unique gestures, but also motion information 112 can be used to define an even more complicated set of gestures. The gesture monitor 170 produces gesture information 172, which can be input as appropriate in connection with delivering services 160.

As mentioned, in another aspect, a device 100 can include a client side memory 180, such as a cache, of potentially relevant points of interest, which, based on the user's movement history can be dynamically updated. The context, such as geography, speed, etc. of the user can be factored in when updating. For instance, if a user's velocity is 2 miles an hour, the user may be walking and interested in updates at a city block by city block level, or at a lower level granularity if they are walking in the countryside. Similarly, if a user is moving on a highway at 60 miles per hour, the block-by-block updates of information are no longer desirable, but rather a granularity can be provided and predictively cached on the device 100 that makes sense for the speed of the vehicle.

Figure 2:
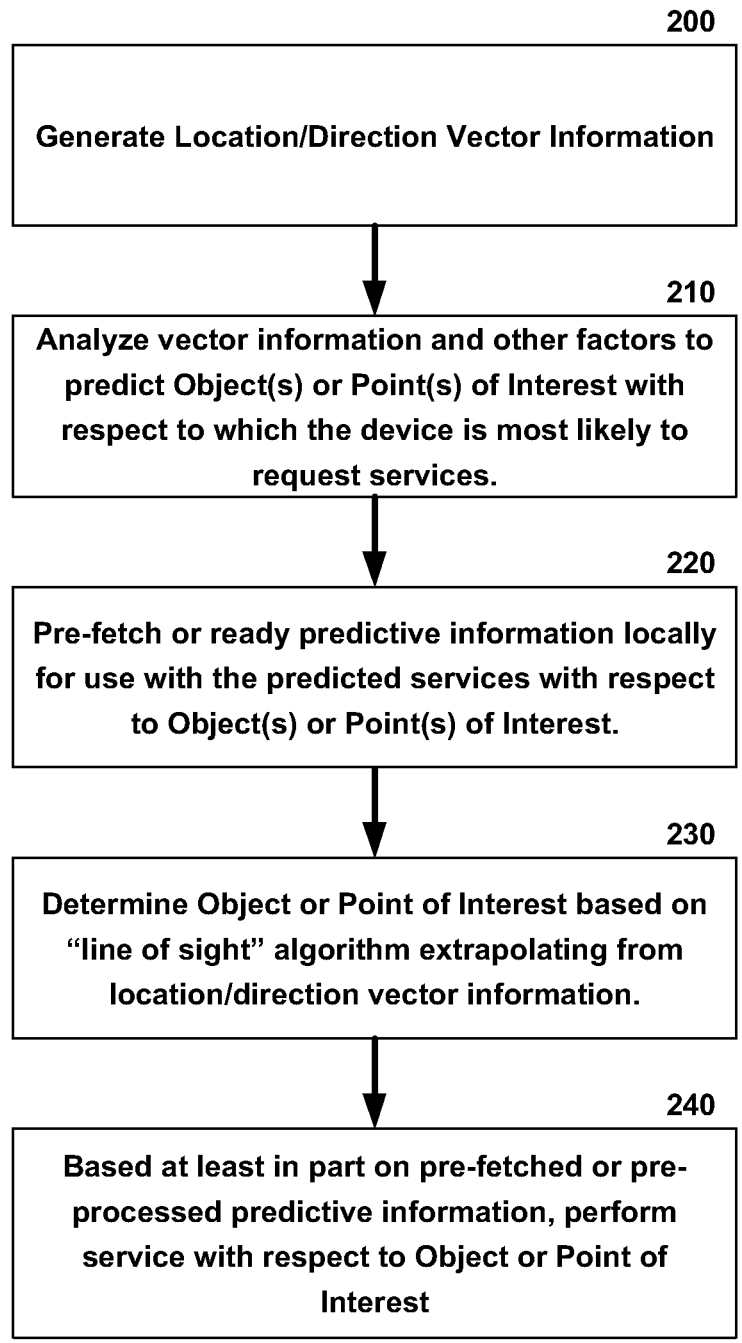
FIG. 2 is an exemplary non-limiting flow diagram of a line of sight process for performing direction based services with respect to points of interest.

A representative interaction with a pointing device as provided in one or more embodiments herein is illustrated in FIG. 2. At 200, location/direction vector information is determined based on the device measurements. This information can be recorded so that a user's path or past can be used when predictively factoring what the user will be interested in next, as illustrated at 210. The predicting can be made based on a variety of other factors as well, such as context, application, user history, preferences, path, time of day, proximity, etc. such that the object(s) or POI(s) a user is most likely to interact with in the future are identified.

At 220, based on the object(s) or POI(s) identified at 210, predictive information is pre-fetched or otherwise pre-processed for use with the predicted services with respect to such object(s) or POI(s). Then, based on current vector information, or more informally, the act of pointing by the user, at 230, an object or point of interest is selected based on any of a variety of "line of sight" algorithms that determine what POI(s) are currently within (or outside) of the vector path. It is noted that occlusion culling techniques can optionally be used to facilitate overlay techniques. In this regard, at 240, based at least in part on the pre-fetched or pre-processed predictive information, services are performed with respect to the object(s) or POI(s).

Additionally, whether the point of interest at issue falls within the vector can factor in the error in precision of any of the measurements, e.g., different GPS subsystems have different error in precision. In this regard, one or more items or points of interest may be found along the vector path or arc, within a certain distance depending on context. As mentioned, at 240, any of a great variety of services can be performed with respect to any point of interest selected by the user via a user interface. Where only one point of interest is concerned, the service can be automatically performed with respect to the point of interest.

For existing motor vehicle navigation devices, or other conventional portable GPS navigation devices, where a device does not natively include directional means such as a compass, the device can have an extension slot that accommodates direction information from an external directional device, such as a compass. Similarly, for laptops or other portable electronic devices, such devices can be outfitted with a card or board with a slot for a compass. While any of the services described herein can make web service calls as part of the pointing and retrieval of endpoint process, as mentioned, limited bandwidth may degrade the interactive experience. As a result, a limited amount of data can be predictively maintained on a user's device in cache memory and optionally aged out as data becomes stale, e.g., when relevance to the user falls below a threshold.

Figure 3:
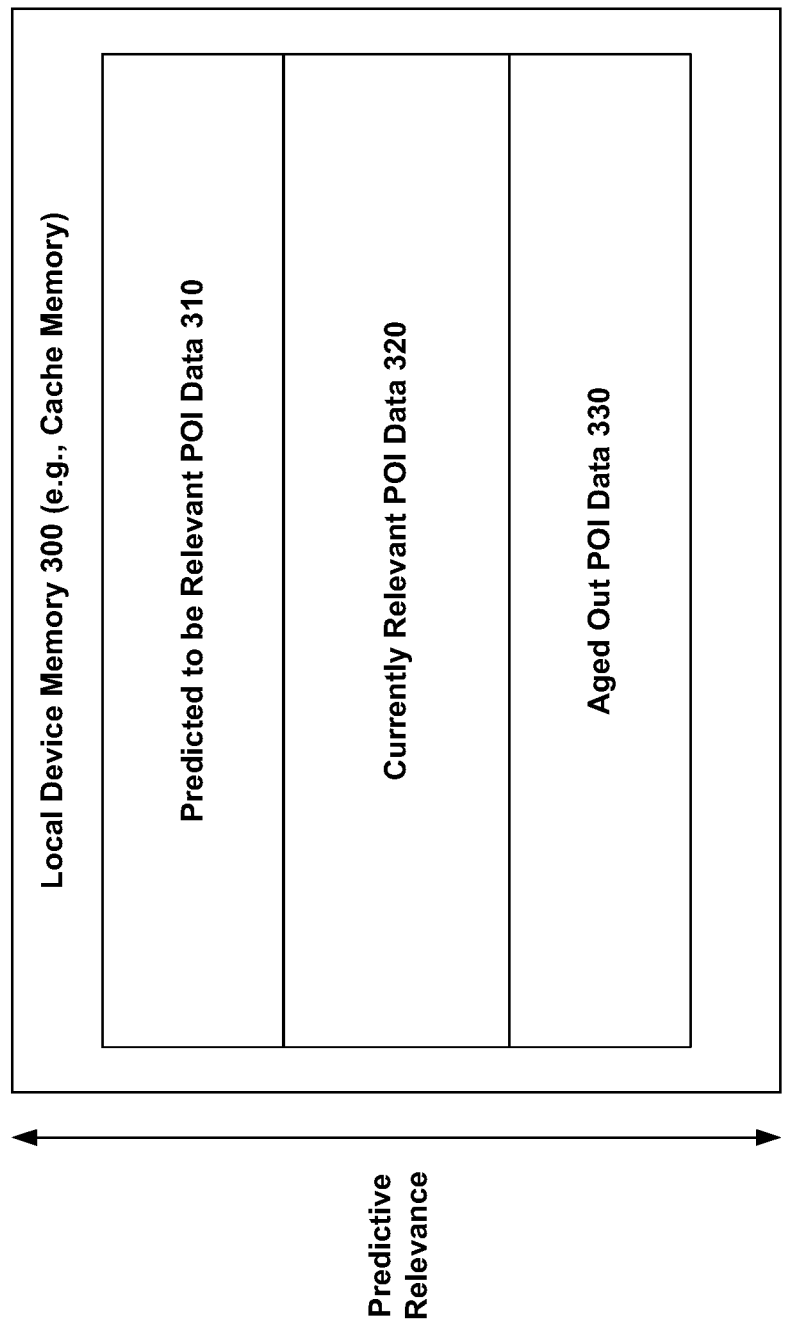
FIG. 3 is a block diagram illustrating a representative segmentation of local memory of a device to support predictive pointing based services.

In this regard, FIG. 3 illustrates that local device memory 300, such as cache memory, can include three general categories of information in connection with the predictive pointer based services. As mentioned, a first category includes information that is being predicted to be relevant POI data 310. This data 310 can be a combination of POI data that is currently being pre-fetched and/or POI data that has already been pre-fetched. Currently relevant POI data 320 is POI data with which the user can presently interact in real-time since the POI data 320 has been pre-fetched and the user is within interaction range of the corresponding POIs. A third category of POI data includes aged out POI data 330, which can be data that has already been deleted, or which will be deleted upon meeting further criteria, such as age of POI data 330, distance from the associated POIs, etc.

Figure 4:
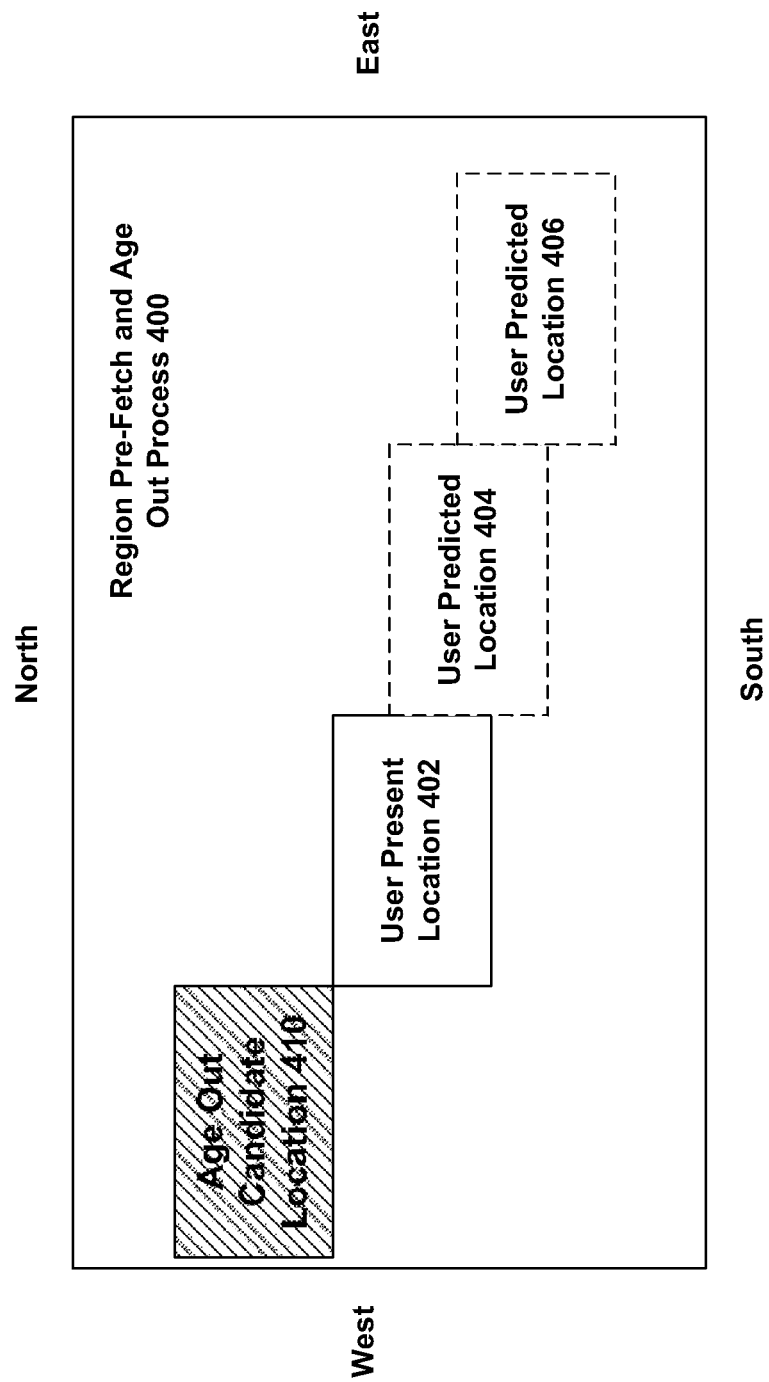
FIG. 4 illustrates a process for predicting points of interest and aging out old points of interest in a region-based algorithm.

FIG. 4 is a block diagram of an example region based prediction algorithm 400 that takes into account user path and heading, e.g., as a user has moved from age out candidate 410 to the present location 402, and based on a current user path, locations 404 and 406 are predicted for the user. Accordingly, based on the direction and location based path history, POI data for locations 404 and 406 can be pre-fetched to local memory of the device. Similarly, location 410 becomes the topic for a decision as to when to age out the data. Such an age out decision can also be made based on the amount of unused space remaining in memory of the device.

Figure 5:
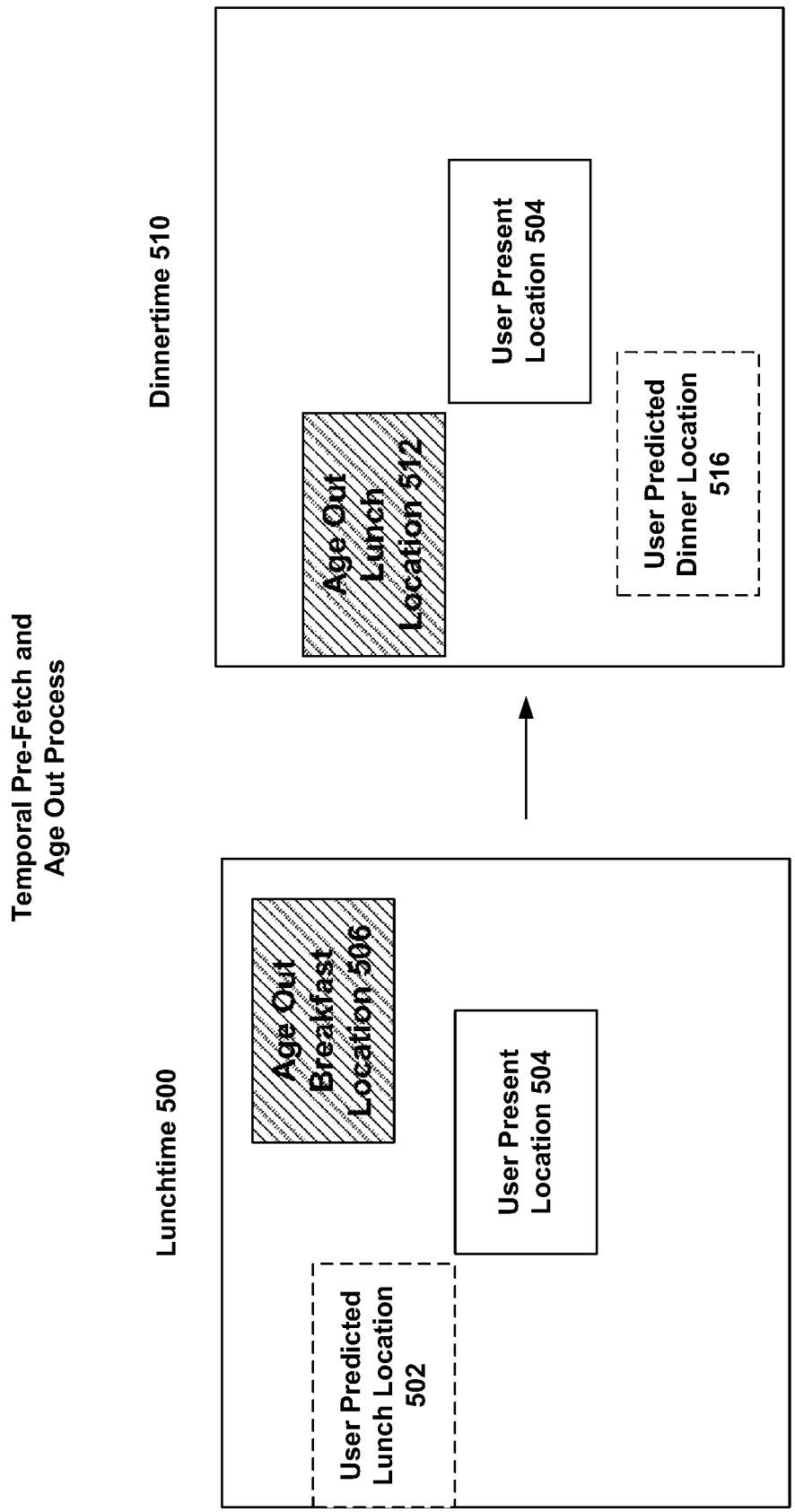
FIG. 5 illustrates a process for predicting points of interest and aging out old points of interest in a time-based algorithm.

While FIG. 4 illustrates a path based algorithm, as mentioned, other algorithms can be used to predict what POIs will be of interest as well. For instance, FIG. 5 is a block diagram of a temporal pre-fetch and age out process. In this regard, the left side of FIG. 5 represents lunchtime 500 and the right side of FIG. 5 represents dinnertime 510. At lunchtime 500, a breakfast location 506 may be a POI that is subject to age out conditions, the user may be actually located at 504, and based on past behavior, the user is predicted to go to lunch at location 502. Thus, information about location 502 is pre-fetched for potential user interaction. However, as time passes, at dinnertime 510, the relevance of various POIs changes. For instance, the lunch location may be closed at dinnertime, and so location 502 becomes age out lunch location 512 subject to age-out criteria. The user has moved again to location 504, but at dinnertime, the algorithm predicts that a dinner location 516 is selected, and thus information, content, etc. relating to dinner location 516 and potential user interactions with dinner location 516 are pre-fetched to the user device.

Figure 6:
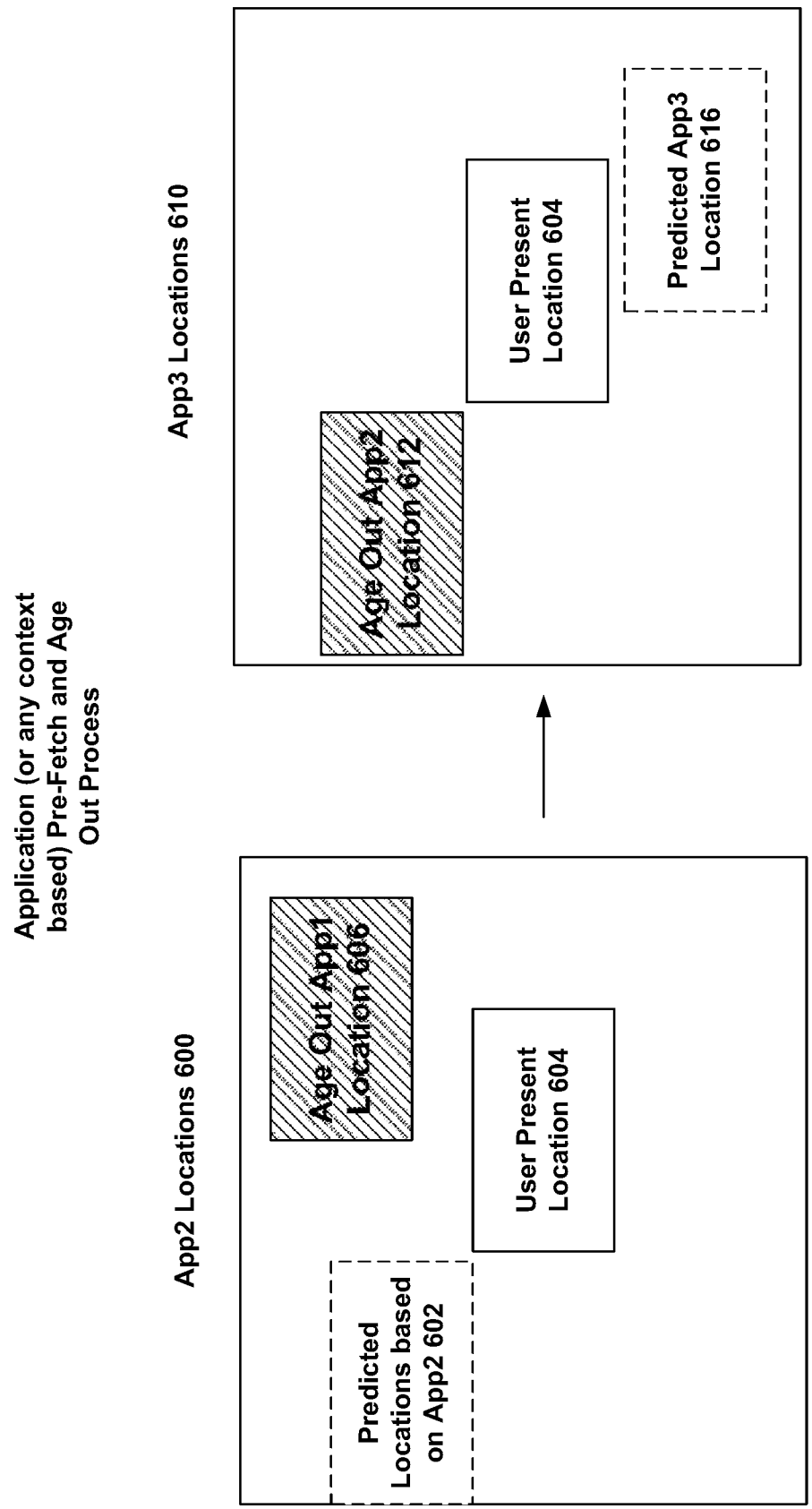
FIG. 6 illustrates a process for predicting points of interest and aging out old points of interest in an application context-based algorithm.

FIG. 6 in turn illustrates yet another predictive algorithm that can be employed to pre-fetch POI data, alone or in combination, with the other algorithms. In this example, application context drives POI relevancy to a user in determining what POI data to age out, maintain for current interactions, or predict. For instance, previously a user may have been using a first application called "App1," however at some time later, the user switched to a second application called "App2." This later time is illustrated on the left side of FIG. 6. Then, at some even later time, the user again switches to a third application called "App3." In such an embodiment, the POI locations 600 for App2 that will have POI data predictively pre-fetched will be different than under the circumstances of POI locations for App3. For instance, with pre-fetching of App2 locations, perhaps App1 location 606 is aged out, a user's present location is at location 604, and POI locations 602 are particularly pertinent to the use of App2. In contrast, with pre-fetching of App3 locations, even if the user's present location stays the same at 604, the POI locations 616 that are pertinent to App3 may be different than POI locations 602, which may be aged out when using App3 as shown at age out App2 location 612.

Figure 7:
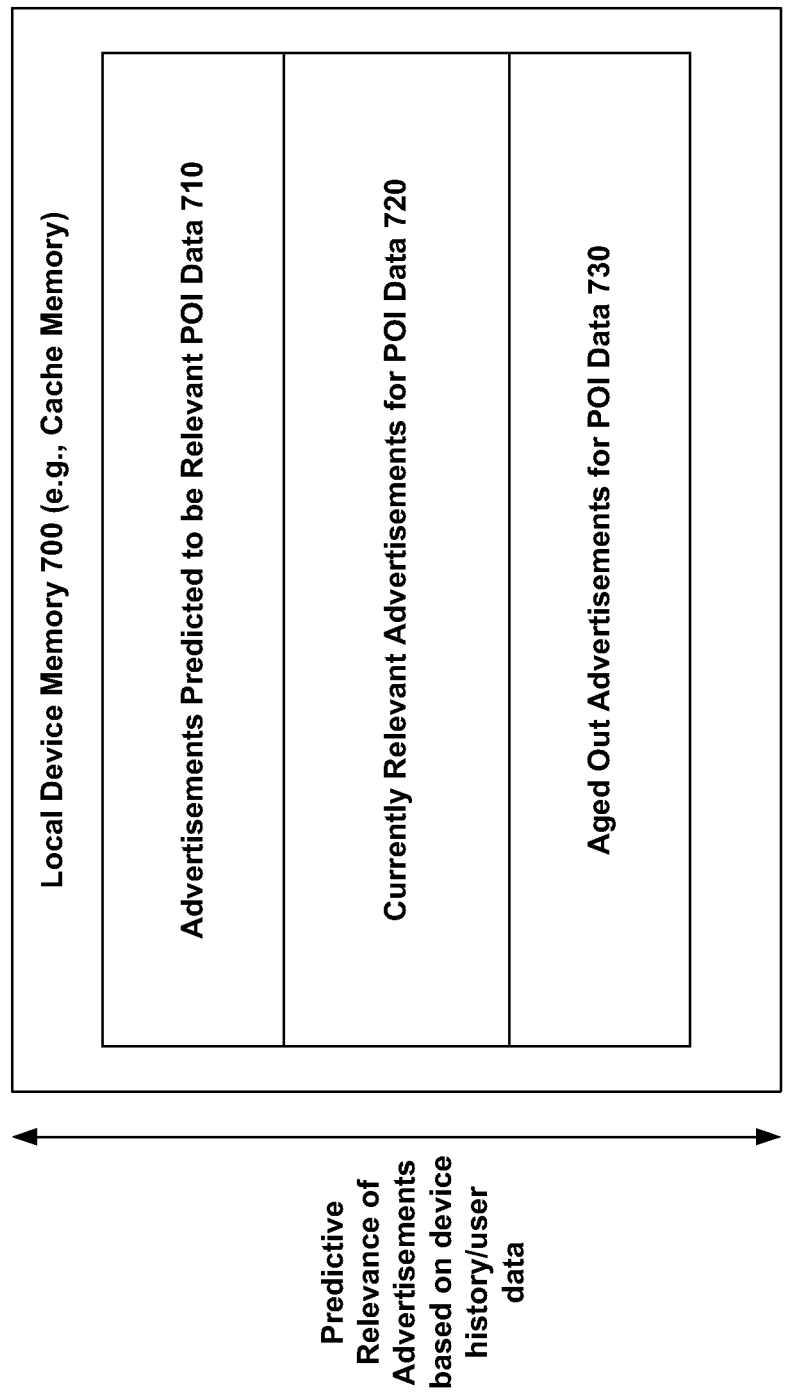
FIG. 7 illustrates an embodiment for predicting points of interest in the context of advertising.

FIG. 7 is a block diagram of an alternate embodiment of segmenting a local memory 700 of a device according to an advertising embodiment. In this regard, based on user data, such as purchase history and the like, POIs can be predictive relevance in terms of their advertising value. Thus, memory 700 can include advertisements for POIs predicted to be relevant 710, currently relevant advertisements for POIs 720 and advertisements for POIs 730 that are being aged out of memory based on low threshold relevance.

Figure 8:
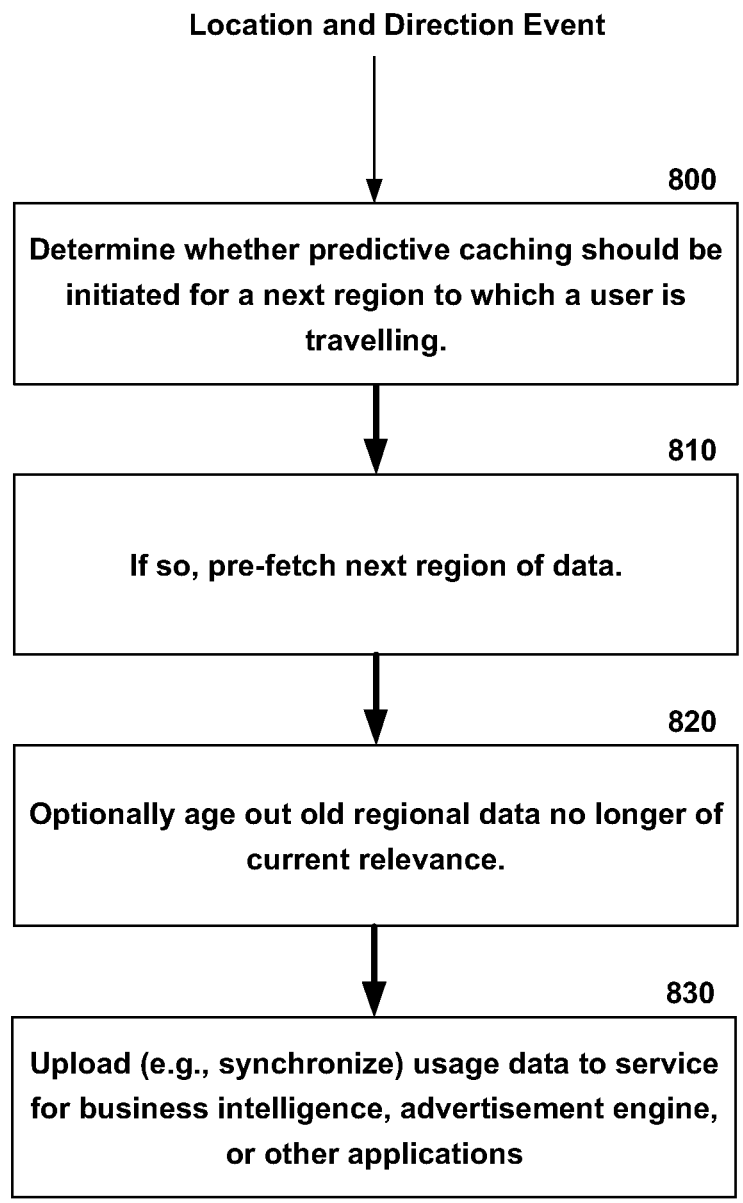
FIG. 8 illustrates a first process for a device upon receiving a location and direction event.

FIG. 8 is a flow diagram generally illustrating a pre-fetch process based on user path. After receiving location and direction events, at 800, it is determined whether predictive caching should be initiated for a next region to which a user is travelling. If so, then at 810, the next region of data is pre-fetched. At 820, optionally, old regional data no longer of current relevance can be aged out. Next, at 830, with the data pre-fetched, a user can interact with the pre-fetched endpoints for the next region of data, and usage data can be uploaded, e.g., synchronized to the service for enhanced business intelligence, more effective advertising, etc. in the future. In this way, the predictive capabilities of the pointer device become better over time as more and more is gathered and known about the usage patterns of the particular device, as well as particular users, where multiple users employ the pointer based services of the device.

Figure 9:
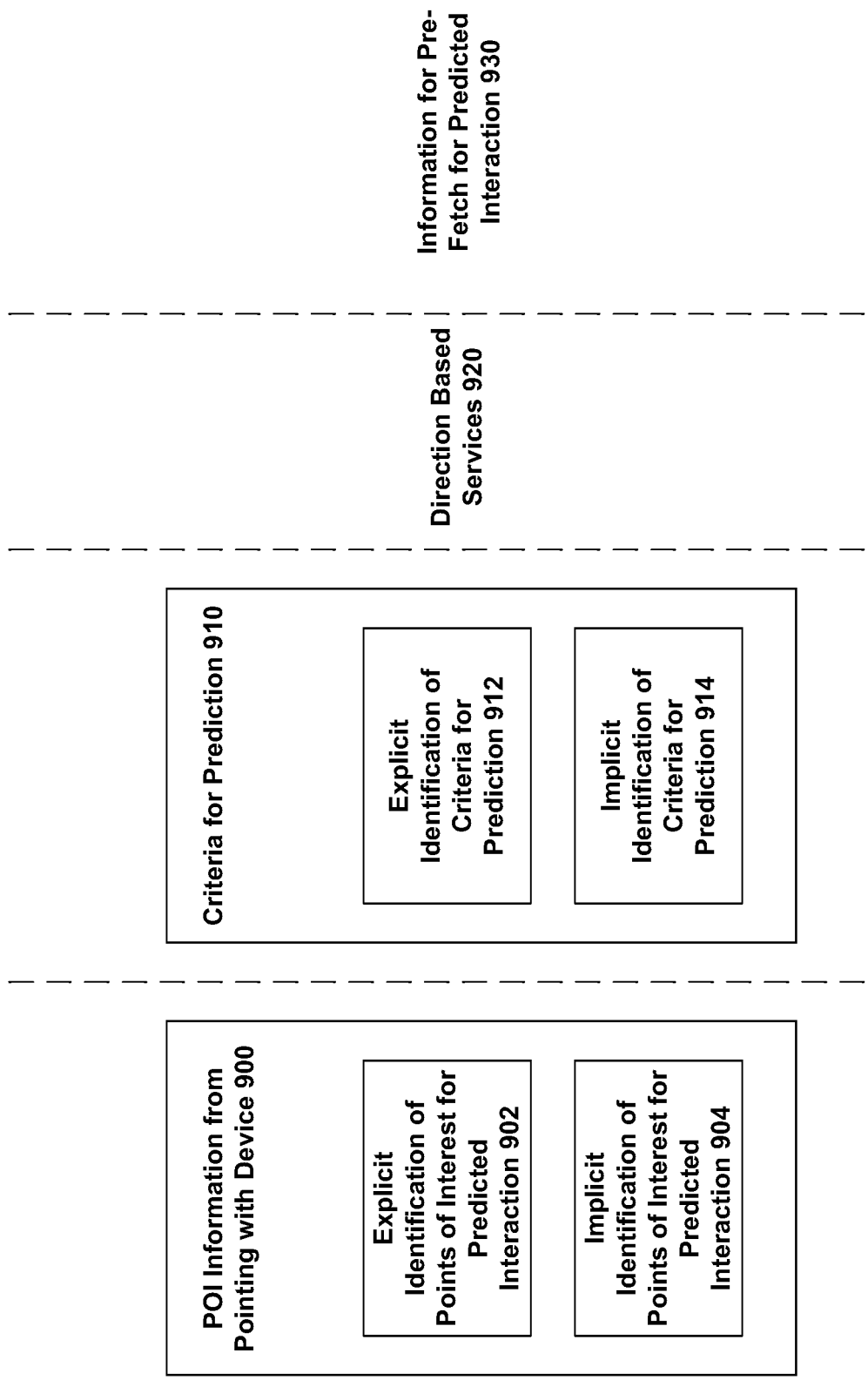
FIG. 9 is a block diagram illustrating client to service support of predictive pointing based services.

FIG. 9 is a block diagram illustrating further ways to determine how to predict POIs. For instance, a device 900 having POI information from pointing with the device can include ways 902 to explicitly identify, e.g., by selecting, the POIs for predicted interaction 902, or ways 904 to implicitly identify, e.g., by indicating low blood sugar via a biometric, that food is desirable. In this regard, criteria for prediction 910 can therefore include explicitly identified criteria 912 or implicitly identified criteria 914 in connection with direction based services 920. The prediction criteria 910 therefore define what information to pre-fetch for predicted interaction 930.

Figure 10:
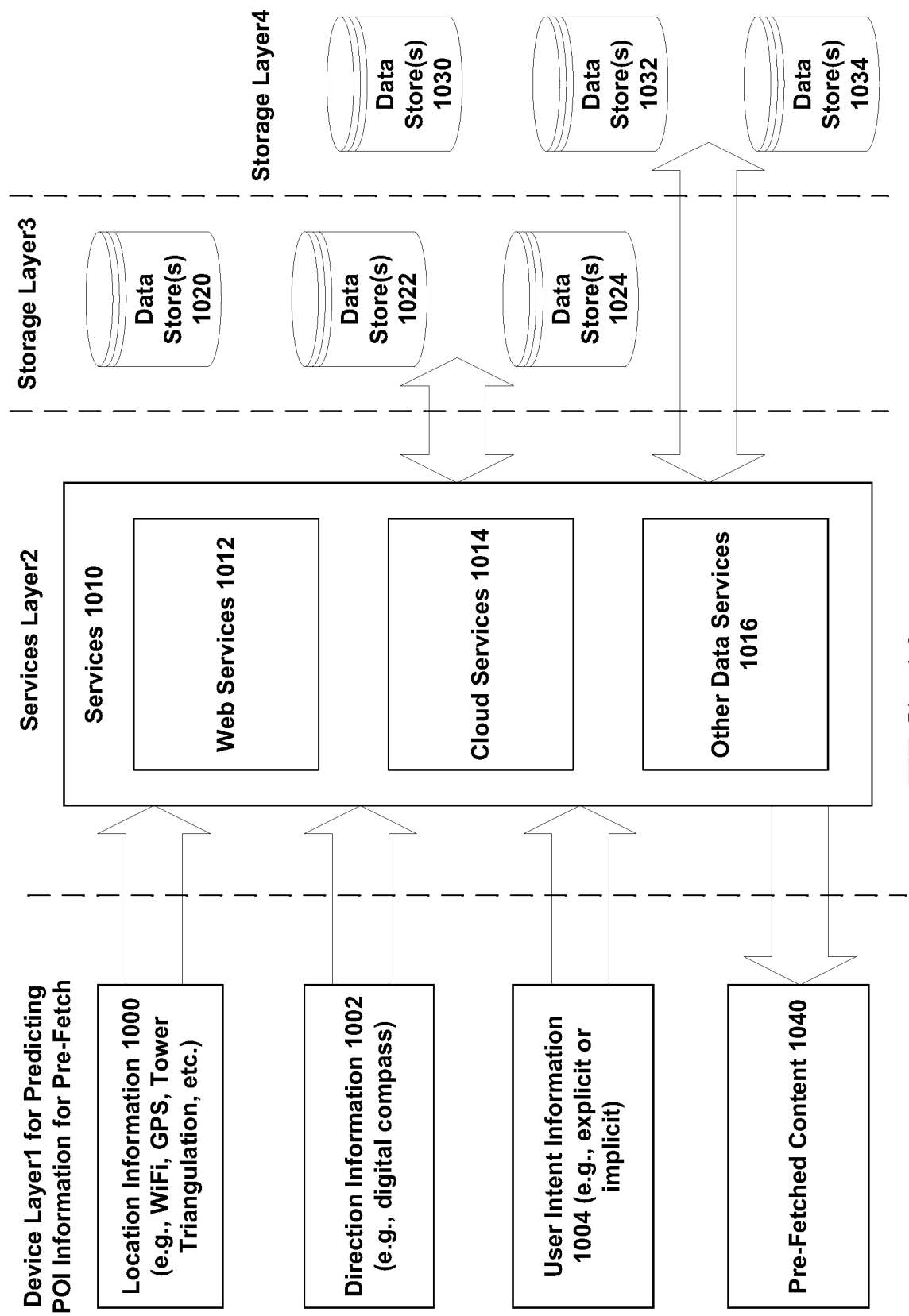
FIG. 10 is a block diagram illustrating a representative architecture for supporting predictive pointing based services.

FIG. 10 is a block diagram of an exemplary general architecture for delivering pointer based services 1010 that predictively pre-fetches POI information according to one or more embodiments. Location information 1000 (e.g., WiFi, GLS, tower triangulation, etc.), direction information 1002 (e.g., digital compass) and user intent information 1004, which can be implicit or explicit, are input to services 1010, which may be any one or more of web services 1012, cloud services 1014 or other data services 1016. As a result, pre-fetched content 1040 is returned for efficient real-time interactions with POIs of current relevance. Pre-fetched data can come from more than one storage layer or abstraction 1020, 1022, 1024, . . . , or abstraction 1030, 1032, 1034, . . . , e.g., from local server databases or remote third party storage locations.

Figure 11:
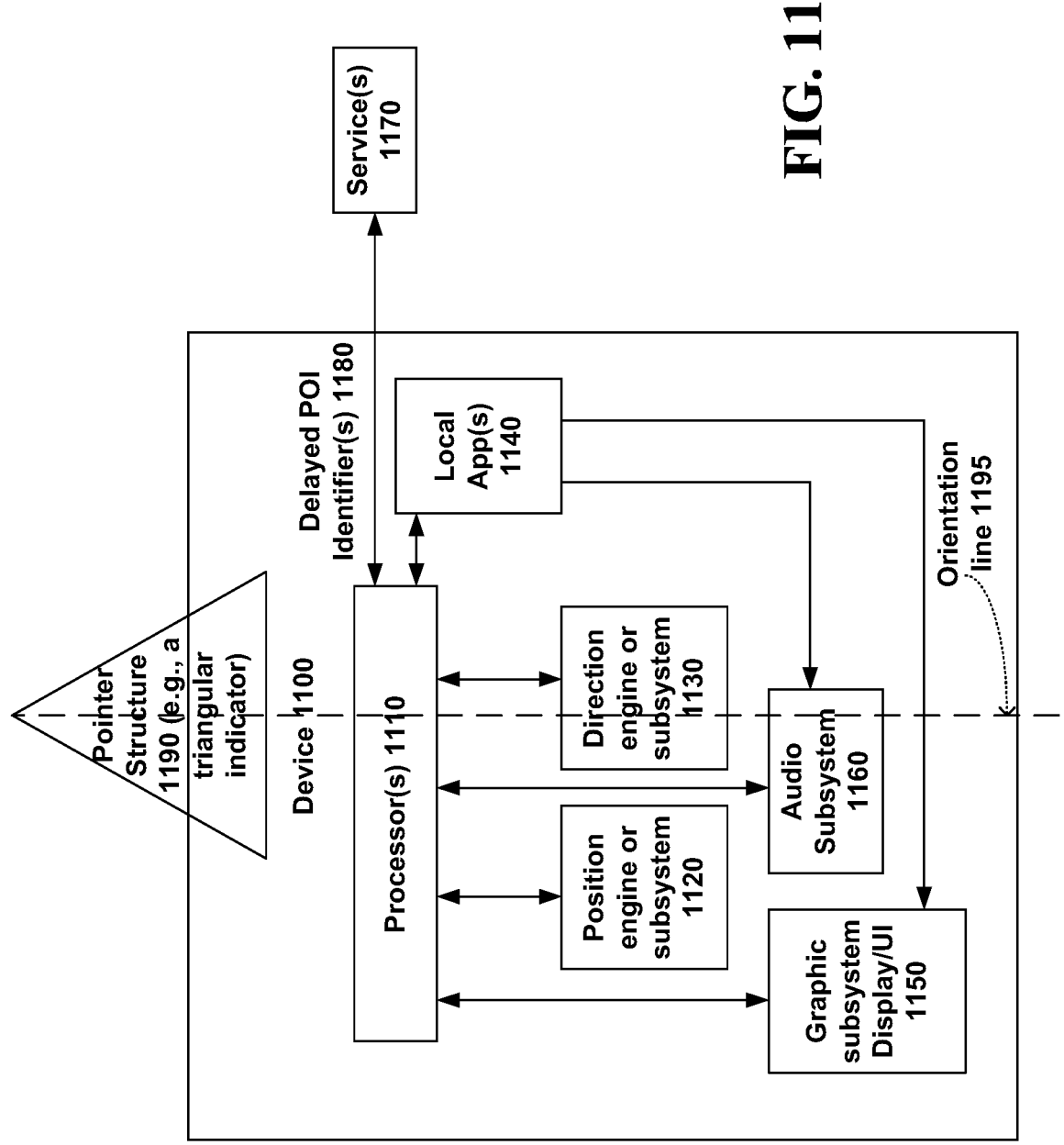
FIG. 11 is a block diagram illustrating a representative device for supporting predictive pointing based services.

FIG. 11 illustrates an exemplary non-limiting device 1100 including processor(s) 1110 having a position engine or subsystem 1120 for determining a location of the device 1100 and a direction engine or subsystem 1130 for determining a direction or orientation of the device 1100. Then, by interacting with local application(s) 1140 and/or service(s) 1170, content can be predictively delivered to the device, which can tailored to device intent and a place in which the device is present, or other factors. When the predicted content is displayed according to a predicted interaction, the tailored content can be rendered by graphic subsystem or display/UI 1150 or audio subsystem 1160. In one non-limiting embodiment, point structure 1190 is included, e.g., a triangular or other polygonal piece that points along an orientation line 1195 upon which directional calculations are based. Similarly, the orientation line 1195 can be indicated by graphics subsystem display/UI 1150 with or without point structure 1190. In this regard, various embodiments herein enable predicted POI ID information 1180 to be pre-fetched from services 1170 so that the predicted interactions can occur in the future as assisted by services 1170.

While there are a variety of implementations, and ways to sub-divide regions, whether overlapping or not, predictive caching and aging can thus be performed in which a user's present location is discerned. The local cache may still include age out candidate locations, but as the velocity of the user indicates the user will be at various other predicted locations in the future, these regions of POIs associated with the predicted locations are downloaded to the mobile device. Accordingly, as the user travels to predicted locations, the user no longer needs the data from the age out candidate locations, which can then be removed, or flagged for removal when storage is challenged.

Accordingly, using the regional data cache, callbacks and an update mechanism that is updated dynamically based on movement, new point of interest can be added by a service or by a user. Update is thus performed continuously or substantially continuously based on updated travel, velocity, speed, etc. In this regard, a user can add a new point of interest in the region, add info to a local cache, and then upload to the zone. To appreciate the problem, the number of worldwide POIs is practically limitless, however only a small number of POIs will be relevant to a user at a given time. Thus, predictively, a cube of data can be taken to the device, the user can go offline such that when the user reconnects, the device is intelligent to figure out what has changed, been weighted, etc., so that the device can synchronize with the network services and expose the user's changes for other people.

As mentioned, the predictive algorithms can depend on what the user is interested in finding, what service the user may be using, the context of the user, etc. They can also be based on velocity, direction, time, etc. For instance, if it is nighttime, assumptions based on demographics or preferences may lead the device to return information about nightclubs or all night diners. Or, instead of giving directions as driving directions that calculate distances as absolute distances, i.e., as the crow flies, a device can take road curves into account since instantaneous pointing information on roads can be collected and handled by a corresponding service when giving driving directions. Or, as another alternative, the direction one is heading on a road, such as a highway with a concrete divider, is relevant to the directions that a navigation system should give. Where a U-turn is unavailable and user passes an exit with a point of interest, for instance, directions should take this into account and consider the heading of the vehicle.

Any device can include the embodiments described herein, including MP3 players, such as a Zune device, GPS navigation devices, bike computers, sunglass/visor systems, motor vehicles, mobile phones, laptops, PDA, etc.

One way to obtain the service applications, assuming the underlying measuring instruments to participate in the real-time gathering of directional information, is to message to a service to obtain the application, e.g., by text messaging to service, or getting a client download link. Another vehicle for enabling the service is to provide it natively in the operating system or applications of a mobile devices. Since a hardware abstraction layer accommodates different methods for collecting position, direction, acceleration information, the same platform can be used on any device regardless of the precise underlying hardware.

Figure 12:
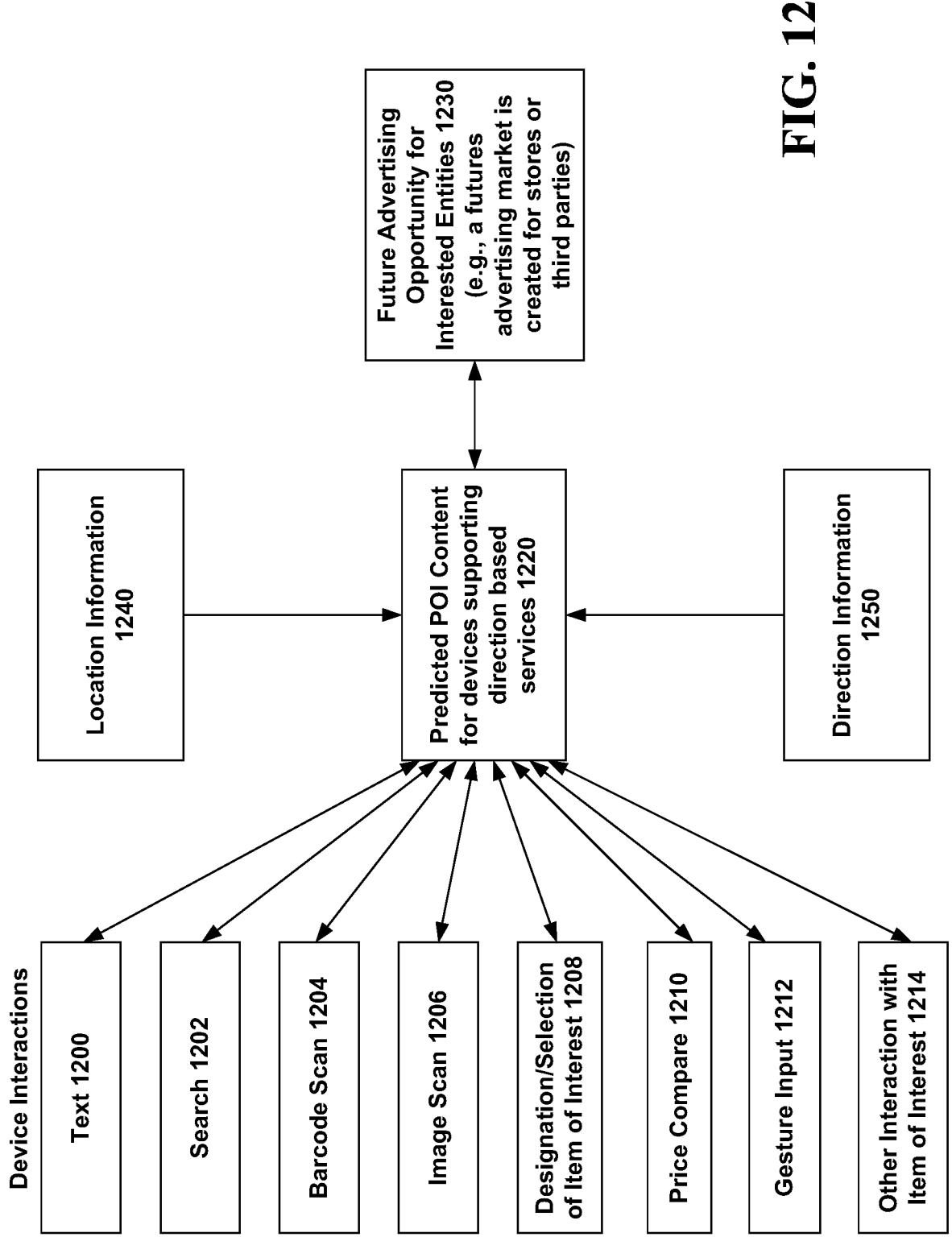
FIG. 12 is a block diagram of an advertising architecture and processes for providing predictive pointing based services.

FIG. 12 is a block diagram illustrating a potential benefit of the predicted POI content 1220 for devices supporting direction based services 1220 based on location information 1240 and direction information 1250, namely, a kind of future advertising opportunity 1230. Based on aggregate data, business intelligence can price based on statistics and other factors, the cost for a future advertising opportunity 1230. In short, if Coca Cola believes that it is likely that a user will be nearby Coca Cola merchandise soon, there is value to Coca Cola in accelerating the process of getting information to the user's device about a Coke coupon, such that the Coke coupon pops up immediately when the user is within 10 feet of a Coke retailer. Even if the opportunity 1230 does not happen, Coca Cola is still willing to pay some price based on the likelihood that 70 out of 100 users at a given position will actually go within 10 feet of a Coke retailer.

Due to the enhanced interactive skills of a device provisioned for direction based location services, FIG. 12 also illustrates a variety of device interactions that help to form aggregate and individual user data for purposes of input to a business intelligence and advertising engine 1230. By measuring interactions with points of interest via text 1200, search 1202, barcode scan 1204, image scan 1206, designation/selection of item of interest 1208, price compare operations 1210, gesture input 1212, other interaction with item of interest 1214, voice input, etc., a lot of user knowledge is gained that can help determine probabilities sufficient to trigger advertising opportunities for interested entities 1230.

Figure 13:
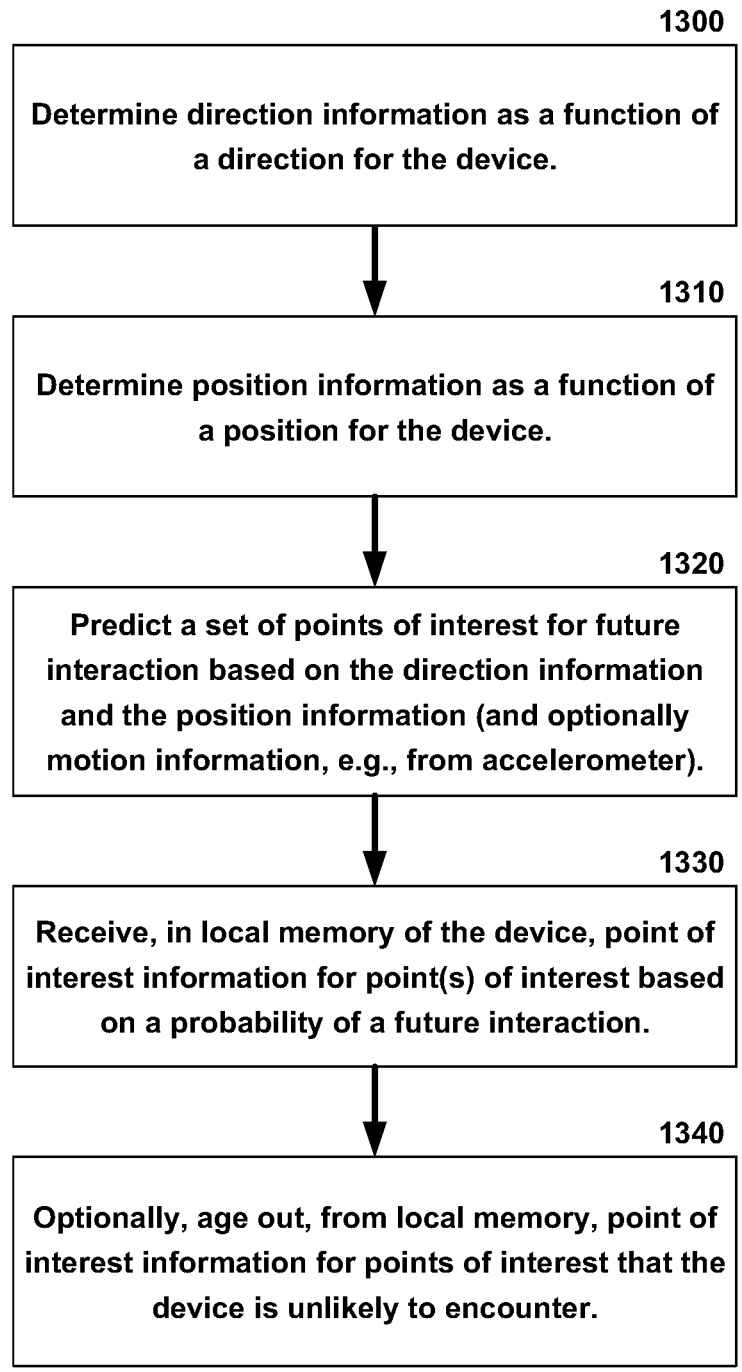
FIG. 13 is a flow diagram of a non-limiting process for providing predictive pointing based services.

FIG. 13 is a flow diagram illustrating an exemplary embodiment for predictively downloading content to a device based on anticipated points of interest. At 1300, direction information is determined as a function of a direction for the device (e.g., compass) and at 1310, position information is determined as a function of a position for the device (e.g., GPS subsystem). At 1320, a set of points of interest are predicted for future interaction based on the direction information and the position information (and optionally motion information, e.g., from accelerometer). The set can also be predicted based on user data, trends, etc. Then at 1330, point of interest information for some or all of the predicted point(s) of interest is received based on probability of future interaction, e.g., retrieved, downloaded, stored, processed, or otherwise made ready for interaction on the direction based services enabled device. At 1340, optionally, point of interest information for points of interest that the device is unlikely to encounter can be aged out from local memory.

With location services, it can be determined that a user's device is physically inside an actual store, or near a window display of a store. Coupling that to the user's interacting with an object of interest with direction information to enable direction-based services results in a new opportunity to take action based on the predicted interaction with specific items. For instance, when near an actual store, a local geo-cache from the store can be pre-fetched to the user's device since it is likely that the user will interact with one or more POIs in the store in the future.

As mentioned, a device can include a directional component that outputs direction information as a function of an orientation of the portable electronic device and that facilitates determining an intent of the device. The directional component can optionally be a digital compass that outputs the direction information. The device can determine a subset of items of interest relative to candidate items of interest within a 3-D space as a function of the positional information or the direction information.

Interacting with an endpoint can include orientating the device toward some item(s) of interest and determining direction information associated with the orientation of the device from which a subset of the item(s) of interest are identified. For instance, interacting can include pointing the device in a direction defining a pointing line generally towards items of interest in the place(s) and determining a set of candidate items of interest as a subset of items of interest that substantially intersect with the pointing line, and enabling the selection of one or more items from the set of candidate items.

In one embodiment, a method for a device provisioned for direction based services comprises determining direction information associated with a pointed to direction relative to a pre-defined orientation of the device and identifying POIs within an area defined as a function of the pointed to direction including determining which of a set of POIs intersect with the area. Next, based on predicted information with respect to the POIs already received by the device, information corresponding to the POIs identified within the area is displayed, e.g., on a map or list. In one embodiment, as new POIs are predicted to be within range of the device soon, the IDs associated with the designated POIs are transmitted to a network service enabling static information and/or dynamic information about the designated POIs to be pre-fetched from the service.

The designation of POIs for interaction can include explicit input with respect to the designated one or more POIs, such as one or more of a gesture input, a keyword input, an audio input, a video camera input or a touchscreen input with respect to the one or more POIs. The designation of POIs for interaction can include implicit input with respect to the designated one or more POIs including making inferences about the interaction based on a context of present interaction.

The displaying of POI information can be made on a topographical map visually representing at least the area defined as a function of a pointed to direction and graphical indications of the POIs can be displayed within the area at corresponding locations on the topographical map view. The POIs can also be represented in a filtered list view, e.g., filtered by restaurants in the area. The designating of POIs can include designating pre-defined criteria explicitly or implicitly. The designating can include marking one or more POIs with touchscreen input relating to the one or more designated POIs, tagging the one or more POIs with tag information, or other ways to designate POIs for interaction, whereby content with respect to the POIs has been predictively fetched in local memory of the device.

In another embodiment, a portable electronic device includes a positional component for receiving position information as a function of a location of the portable electronic device and a directional component that outputs direction information as a function of an orientation of the portable electronic device. In addition, the device includes a processor configured to process the position information and the direction information to determine identifiers or IDs of POIs within a pre-defined geographical area of the device, interact with a selected ID, having already received information about the POI corresponding to the selected identifier, and receive input regarding the selected ID defining an interaction.

Information about the selected ID defining the future interaction is transmitted along with the point of interest to a network service. In one embodiment, a pointer structure is provided on the device that visually indicates the orientation of the portable electronic device based upon which the directional component outputs the direction information. For example, this could be a triangular structure that comes to a point to show a primary orientation of the device. This could also be indicated on the display of the device during provision of direction based services.

In one embodiment, the position information and the direction information determine a pointing line and a set of candidate points of interest are determined as a subset of points of interest that substantially intersect with a function based on the pointing line. An intersection test for determining subsets of points of interest can include defining an arc based on an angle with respect to a pointing line, defining a cone based on an angle with respect to the pointing line, or a line function defining a rectangular space oriented along the pointing line (2-D or 3-D depending on the application). A speaker can render audio content if a condition upon which the predicted interaction is predicated occurs. The directional component can be a digital compass that outputs the direction information.

In another embodiment, a method comprises determining a place in which a portable device is located based on location information determined for the device and identifying a subset of items of interest in the place including determining an orientation of the device based on direction information of the device and determining the subset of items of interest in the place as a function of the orientation. Next, input with respect to an item of the subset of items is received defining an interaction with the item. Predicted interactions can include receiving a notification when a characteristic of an item meets a pre-defined condition, such as when a price of the item meets a target price condition, thereby initiating the predicted interaction.

Supplemental Context Regarding Pointing Devices, Architectures and Services

The following description contains supplemental context regarding potential non-limiting pointing devices, architectures and associated services to further aid in understanding one or more of the above embodiments. Any one or more of any additional features described in this section can be accommodated in any one or more of the embodiments described above with respect to predictive direction based services at a particular location for given POI(s). While such combinations of embodiments or features are possible, for the avoidance of doubt, no embodiments set forth in the subject disclosure should be considered limiting on any other embodiments described herein.

As mentioned, a broad range of scenarios can be enabled by a device that can take location and direction information about the device and build a service on top of that information. For example, by using an accelerometer in coordination with an on board digital compass, an application running on a mobile device updates what each endpoint is "looking at" or pointed towards, attempting hit detection on potential points of interest to either produce real-time information for the device or to allow the user to select a range, or using the GPS, a location on a map, and set information such as "Starbucks—10% off cappuccinos today" or "The Alamo—site of . . . " for others to discover. One or more accelerometers can also be used to perform the function of determining direction information for each endpoint as well. As described herein, these techniques can become more granular to particular items within a Starbucks, such as "blueberry cheesecake" on display in the counter, enabling a new type of sale opportunity.

Accordingly, a general device for accomplishing this includes a processing engine to resolve a line of sight vector sent from a mobile endpoint and a system to aggregate that data as a platform, enabling a host of new scenarios predicated on the pointing information known for the device. The act of pointing with a device, such as the user's mobile phone, thus becomes a powerful vehicle for users to discover and interact with points of interest around the individual in a way that is tailored for the individual. Synchronization of data can also be performed to facilitate roaming and sharing of POV data and contacts among different users of the same service.

In a variety of embodiments described herein, 2-dimensional (2D), 3-§ 4 dimensional (3D) or N-dimensional directional-based search, discovery, and interactivity services are enabled for endpoints in the system of potential interest to the user.

The pointing information and corresponding algorithms depend upon the assets available in a device for producing the pointing or directional information. The pointing information, however produced according to an underlying set of measurement components, and interpreted by a processing engine, can be one or more vectors. A vector or set of vectors can have a "width" or "arc" associated with the vector for any margin of error associated with the pointing of the device. A panning angle can be defined by a user with at least two pointing actions to encompass a set of points of interest, e.g., those that span a certain angle defined by a panning gesture by the user.

In one non-limiting embodiment, a portable electronic device includes a positional component for receiving positional information as a function of a location of the portable electronic device, a directional component that outputs direction information as a function of an orientation of the portable electronic device and a location based engine that processes the positional information and the direction information to determine a subset of points of interest relative to the portable electronic device as a function of at least the positional information and the direction information.

The positional component can be a positional GPS component for receiving GPS data as the positional information. The directional component can be a magnetic compass and/or a gyroscopic compass that outputs the direction information. The device can include acceleration component(s), such as accelerometer(s), that outputs acceleration information associated with movement of the portable electronic device. The use of a separate sensor can also be used to further compensate for tilt and altitude adjustment calculations.

In one embodiment, the device includes a cache memory for dynamically storing a subset of endpoints of interest that are relevant to the portable electronic device and at least one interface to a network service for transmitting the positional information and the direction information to the network service. In return, based on real-time changes to the positional information and direction/pointing information, the device dynamically receives in the cache memory an updated subset of endpoints that are potentially relevant to the portable electronic device.

For instance, the subset of endpoints can be updated as a function of endpoints of interest within a pre-defined distance substantially along a vector defined by the orientation of the portable electronic device. Alternatively or in addition, the subset of endpoints can be updated as a function of endpoints of interest relevant to a current context of the portable electronic device. In this regard, the device can include a set of Representational State Transfer (REST)-based application programming interfaces (APIs), or other stateless set of APIs, so that the device can communicate with the service over different networks, e.g., Wi-Fi, a GPRS network, etc. or communicate with other users of the service, e.g., Bluetooth. For the avoidance of doubt, the embodiments are in no way limited to a REST based implementation, but rather any other state or stateful protocol could be used to obtain information from the service to the devices.

The directional component outputs direction information including compass information based on calibrated and compensated heading/directionality information. The directional component can also include direction information indicating upward or downward tilt information associated with a current upward or downward tilt of the portable electronic device, so that the services can detect when a user is pointing upwards or downwards with the device in addition to a certain direction. The height of the vectors itself can also be taken into account to distinguish between an event of pointing with a device from the top of a building (likely pointing to other buildings, bridges, landmarks, etc.) and the same event from the bottom of the building (likely pointing to a shop at ground level), or towards a ceiling or floor to differentiate among shelves in a supermarket. A 3-axis magnetic field sensor can also be used to implement a compass to obtain tilt readings.

Secondary sensors, such as altimeters or pressure readers, can also be included in a mobile device and used to detect a height of the device, e.g., what floor a device is on in a parking lot or floor of a department store (changing the associated map/floorplan data). Where a device includes a compass with a planar view of the world (e.g., 2-axis compass), the inclusion of one or more accelerometers in the device can be used to supplement the motion vector measured for a device as a virtual third component of the motion vector, e.g., to provide measurements regarding a third degree of freedom. This option may be deployed where the provision of a 3-axis compass is too expensive, or otherwise unavailable.

In this respect, a gesturing component can also be included in the device to determine a current gesture of a user of the portable electronic device from a set of pre-defined gestures. For example, gestures can include zoom in, zoom out, panning to define an arc, all to help filter over potential subsets of points of interest for the user.

For instance, web services can effectively resolve vector coordinates sent from mobile endpoints into <x,y,z> or other coordinates using location data, such as GPS data, as well as configurable, synchronized POV information similar to that found in a GPS system in an automobile. In this regard, any of the embodiments can be applied similarly in any motor vehicle device. One non-limiting use is also facilitation of endpoint discovery for synchronization of data of interest to or from the user from or to the endpoint.

Figure 14:
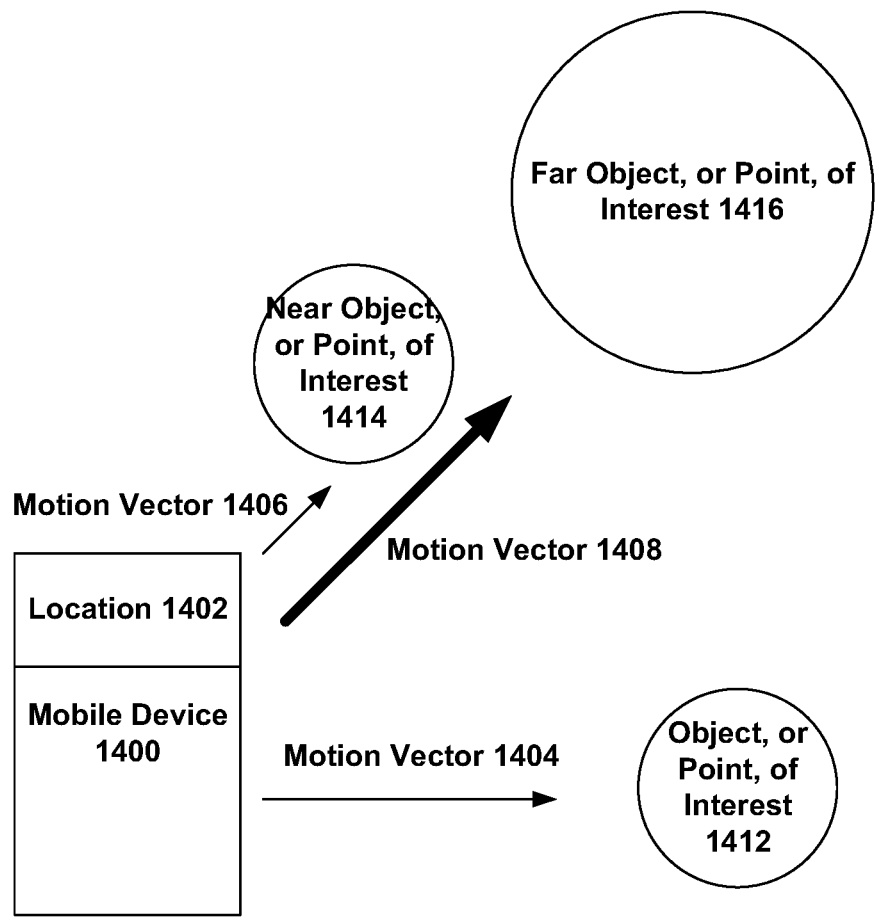
FIG. 14 is a block diagram illustrating the formation of motion vectors for use in connection with location based services.

Among other algorithms for interpreting position/motion/direction information, as shown in FIG. 14, a device 1400 employing the direction based location based services 1402 as described herein in a variety of embodiments herein include a way to discern between near objects, such as POI 1414 and far objects, such as POI 1416. Depending on the context of usage, the time, the user's past, the device state, the speed of the device, the nature of the POIs, etc., the service can determine a general distance associated with a motion vector. Thus, a motion vector 1406 will implicate POI 1414, but not POI 1416, and the opposite would be true for motion vector 1408.

In addition, a device 1400 includes an algorithm for discerning items substantially along a direction at which the device is pointing, and those not substantially along a direction at which the device is pointing. In this respect, while motion vector 1404 might implicate POI 1412, without a specific panning gesture that encompassed more directions/vectors, POIs 1414 and 1416 would likely not be within the scope of points of interest defined by motion vector 1404. The distance or reach of a vector can also be tuned by a user, e.g., via a slider control or other control, to quickly expand or contract the scope of endpoints encompassed by a given "pointing" interaction with the device.

In one non-limiting embodiment, the determination of at what or whom the user is pointing is performed by calculating an absolute "Look" vector, within a suitable margin of error, by a reading from an accelerometer's tilt and a reading from the magnetic compass. Then, an intersection of endpoints determines an initial scope, which can be further refined depending on the particular service employed, i.e., any additional filter. For instance, for an apartment search service, endpoints falling within the look vector that are not apartments ready for lease, can be pre-filtered.

In addition to the look vector determination, the engine can also compensate for, or begin the look vector, where the user is by establish positioning (~15 feet) through an A-GPS stack (or other location based or GPS subsystem including those with assistance strategies) and also compensate for any significant movement/acceleration of the device, where such information is available.

As mentioned, in another aspect, a device can include a client side cache of potentially relevant points of interest, which, based on the user's movement history can be dynamically updated. The context, such as geography, speed, etc. of the user can be factored in when updating. For instance, if a user's velocity is 2 miles an hour, the user may be walking and interested in updates at a city block by city block level, or at a lower level granularity if they are walking in the countryside. Similarly, if a user is moving on a highway at 60 miles per hour, the block-by-block updates of information are no longer desirable, but rather a granularity can be provided and predictively cached on the device that makes sense for the speed of the vehicle.

In an automobile context, the location becomes the road on which the automobile is travelling, and the particular items are the places and things that are passed on the roadside much like products in a particular retail store on a shelf or in a display. The pointing based services thus creates a virtual "billboard" opportunity for items of interest generally along a user's automobile path. Proximity to location can lead to an impulse buy, e.g., a user might stop by a museum they are passing and pointing at with their device, if offered a discount on admission.

In various alternative embodiments, gyroscopic or magnetic compasses can provide directional information. A REST based architecture enables data communications to occur over different networks, such as Wi-Fi and GPRS architectures. REST based APIs can be used, though any stateless messaging can be used that does not require a long keep alive for communicated data/messages. This way, since networks can go down with GPRS antennae, seamless switching can occur to Wi-Fi or Bluetooth networks to continue according to the pointing based services enabled by the embodiments described herein.

A device as provided herein according to one or more embodiments can include a file system to interact with a local cache, store updates for synchronization to the service, exchange information by Bluetooth with other users of the service, etc. Accordingly, operating from a local cache, at least the data in the local cache is still relevant at a time of disconnection, and thus, the user can still interact with the data. Finally, the device can synchronize according to any updates made at a time of re-connection to a network, or to another device that has more up to date GPS data, POI data, etc. In this regard, a switching architecture can be adopted for the device to perform a quick transition from connectivity from one networked system (e.g., cell phone towers) to another computer network (e.g., Wi-Fi) to a local network (e.g., mesh network of Bluetooth connected devices).

With respect to user input, a set of soft keys, touch keys, etc. can be provided to facilitate in the directional-based pointing services provided herein. A device can include a windowing stack in order to overlay different windows, or provide different windows of information regarding a point of interest (e.g., hours and phone number window versus interactive customer feedback window). Audio can be rendered or handled as input by the device. For instance, voice input can be handled by the service to explicitly point without the need for a physical movement of the device. For instance, a user could say into a device "what is this product right in front of me? No, not that one, the one above it" and have the device transmit current direction/movement information to a service, which in turn intelligently, or iteratively, determines what particular item of interest the user is pointing at, and returns a host of relevant information about the item.

Figure 15:
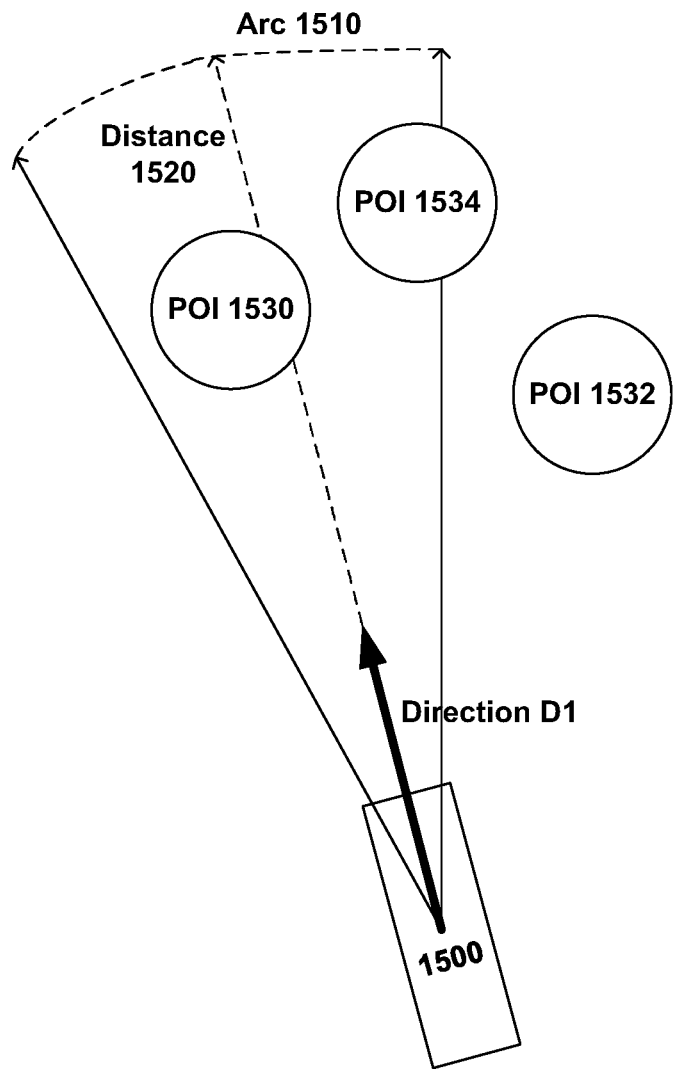
FIG. 15, FIG. 16 and FIG. 17 illustrate aspects of algorithms for determining intersection endpoints with a pointing direction of a device.

One non-limiting way for determining a set of points of interest is illustrated in FIG. 15. In FIG. 15, a device 1500 is pointed (e.g., point and click) in a direction D1, which according to the device or service parameters, implicitly defines an area within arc 1510 and distance 1520 that encompasses POI 1530, but does not encompass POI 1532. Such an algorithm will also need to determine any edge case POIs, i.e., whether POIs such as POI 1534 are within the scope of pointing in direction D1, where the POI only partially falls within the area defined by arc 1510 and distance 1520.

Figure 16:
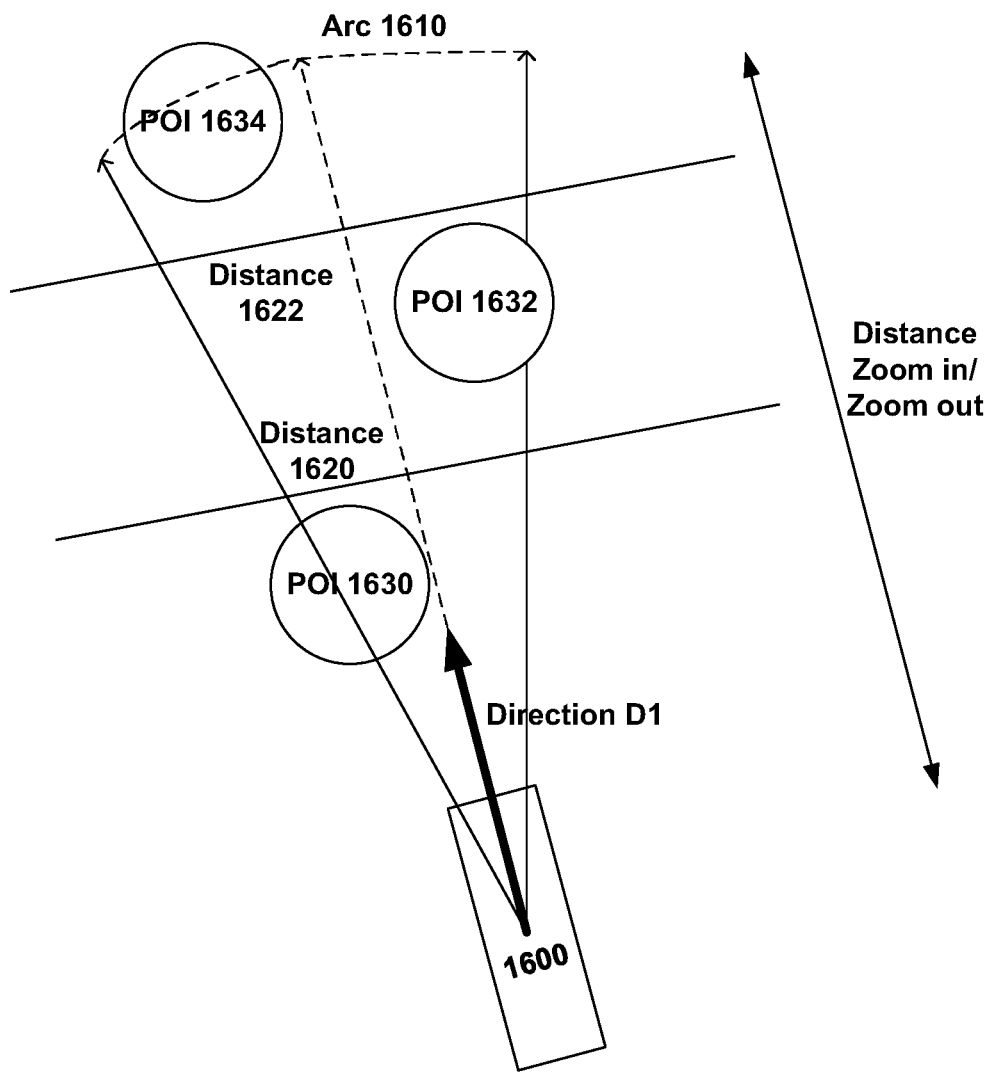

Other gestures that can be of interest in for a gesturing subsystem include recognizing a user's gesture for zoom in or zoom out. Zoom in/zoom out can be done in terms of distance like FIG. 16. In FIG. 16, a device 1600 pointed in direction D1 may include zoomed in view which includes points of interest within distance 1620 and arc 1610, or a medium zoomed view representing points of interest between distance 1620 and 1622, or a zoomed out view representing points of interest beyond distance 1622. These zoom zones correspond to POIs 1630, 1632 and 1634, respectively. More or less zones can be considered depending upon a variety of factors, the service, user preference, etc.

Figure 17:
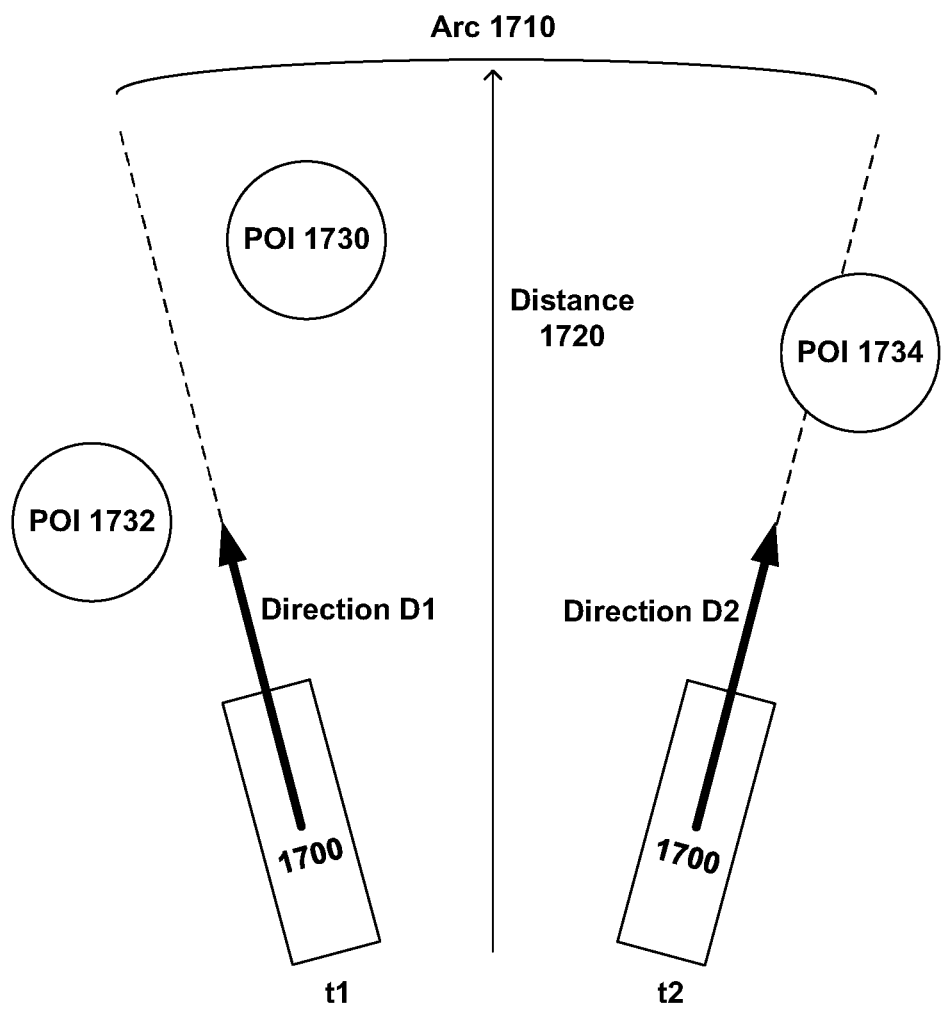

For another non-limiting example, with location information and direction information, a user can input a first direction via a click, and then a second direction after moving the device via a second click, which in effect defines an arc 1710 for objects of interest in the system as illustrated in FIG. 17. For instance, via first pointing act by the user at time t1 in direction D1 and a second pointing act at time t2 by the user in direction D2, an arc 1710 is implicitly defined. The area of interest implicitly includes a search of points of object within a distance 1720, which can be zoomed in and out, or selected by the service based on a known granularity of interest, selected by the user, etc. This can be accomplished with a variety of forms of input to define the two directions. For instance, the first direction can be defined upon a click-and-hold button event, or other engage-and-hold user interface element, and the second direction can be defined upon release of the button. Similarly, two consecutive clicks corresponding to the two different directions D1 and D2 can also be implemented.

Also, instead of focusing on real distance, zooming in or out could also represent a change in terms of granularity, or size, or hierarchy of objects. For example, a first pointing gesture with the device may result in a shopping mall appearing, but with another gesture, a user could carry out a recognizable gesture to gain or lose a level of hierarchical granularity with the points of interest on display. For instance, after such gesture, the points of interest could be zoomed in to the level of the stores at the shopping mall and what they are currently offering.

In addition, a variety of even richer behaviors and gestures can be recognized when acceleration of the device in various axes can be discerned. Panning, arm extension/retraction, swirling of the device, backhand tennis swings, breaststroke arm action, golf swing motions could all signify something unique in terms of the behavior of the pointing device, and this is to just name a few motions that could be implemented in practice. Thus, any of the embodiments herein can define a set of gestures that serve to help the user interact with a set of services built on the pointing platform, to help users easily gain information about points of information in their environment.

Furthermore, with relatively accurate upward and downward tilt of the device, in addition to directional information such as calibrated and compensated heading/directional information, other services can be enabled. Typically, if a device is ground level, the user is outside, and the device is "pointed" up towards the top of buildings, the granularity of information about points of interest sought by the user (building level) is different than if the user was pointing at the first floor shops of the building (shops level), even where the same compass direction is implicated. Similarly, where a user is at the top of a landmark such as the Empire State building, a downward tilt at the street level (street level granularity) would implicate information about different points of interest that if the user of the device pointed with relatively no tilt at the Statue of Liberty (landmark/building level of granularity).

Also, when a device is moving in a car, it may appear that direction is changing as the user maintains a pointing action on a single location, but the user is still pointing at the same thing due to displacement. Thus, thus time varying location can be factored into the mathematics and engine of resolving at what the user is pointing with the device to compensate for the user experience based upon which all items are relative.

Accordingly, armed with the device's position, one or more web or cloud services can analyze the vector information to determine at what or whom the user is looking/pointing. The service can then provide additional information such as ads, specials, updates, menus, happy hour choices, etc., depending on the endpoint selected, the context of the service, the location (urban or rural), the time (night or day), etc. As a result, instead of a blank contextless Internet search, a form of real-time visual search for users in real 3-D environments is provided.

In one non-limiting embodiment, the direction based pointing services are implemented in connection with a pair of glasses, headband, etc. having a corresponding display means that acts in concert with the user's looking to highlight or overlay features of interest around the user.

Figure 18:
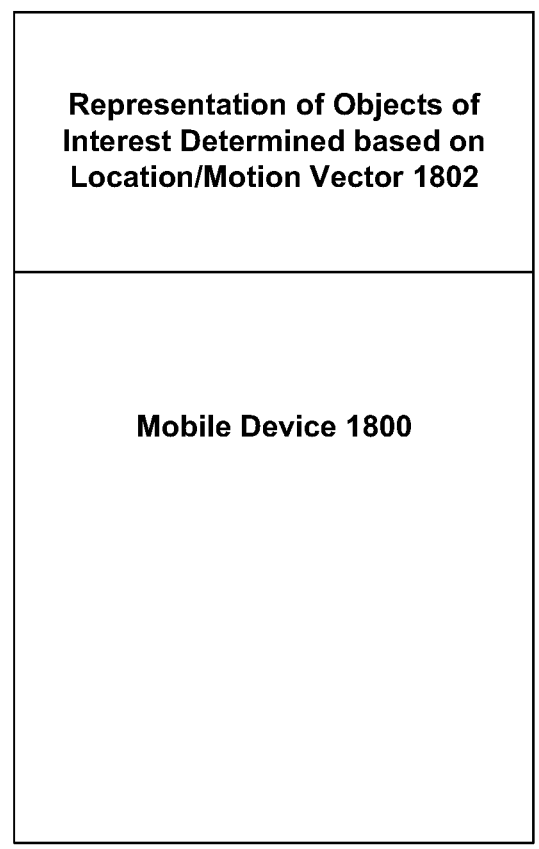
FIG. 18 represents a generic user interface for a mobile device for representing points of interest based on pointing information.

As shown in FIG. 18, once a set of objects is determined from the pointing information according to a variety of contexts of a variety of services, a mobile device 1800 can display the objects via representation 1802 according to a variety of user experiences tailored to the service at issue. For instance, a virtual camera experience can be provided, where POI graphics or information can be positioned relative to one another to simulate an imaging experience. A variety of other user interface experiences can be provided based on the pointing direction as well.

Figure 19:
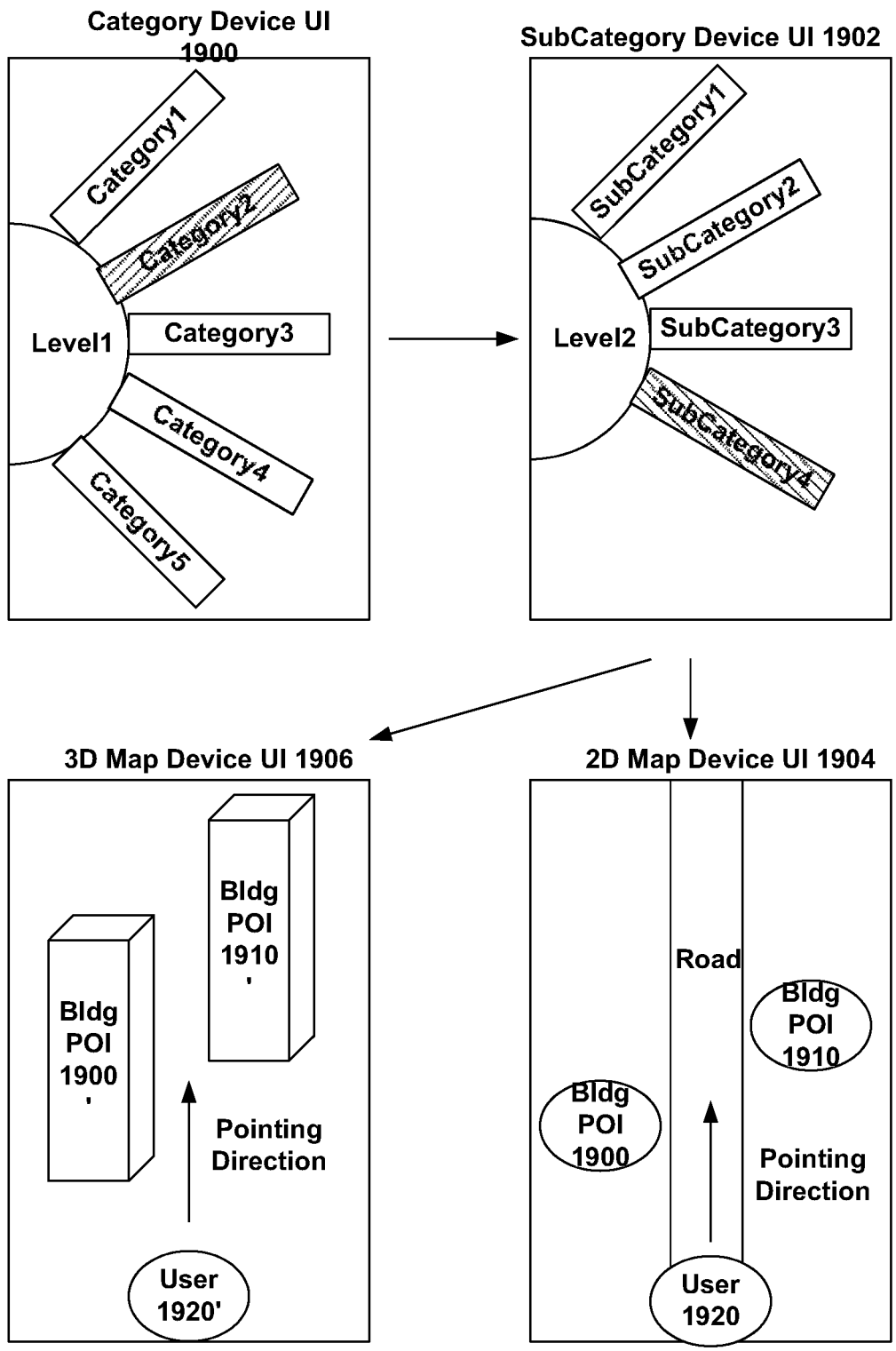
FIG. 19 represents some exemplary, non-limiting alternatives for user interfaces for representing point of interest information.
Figure 20:
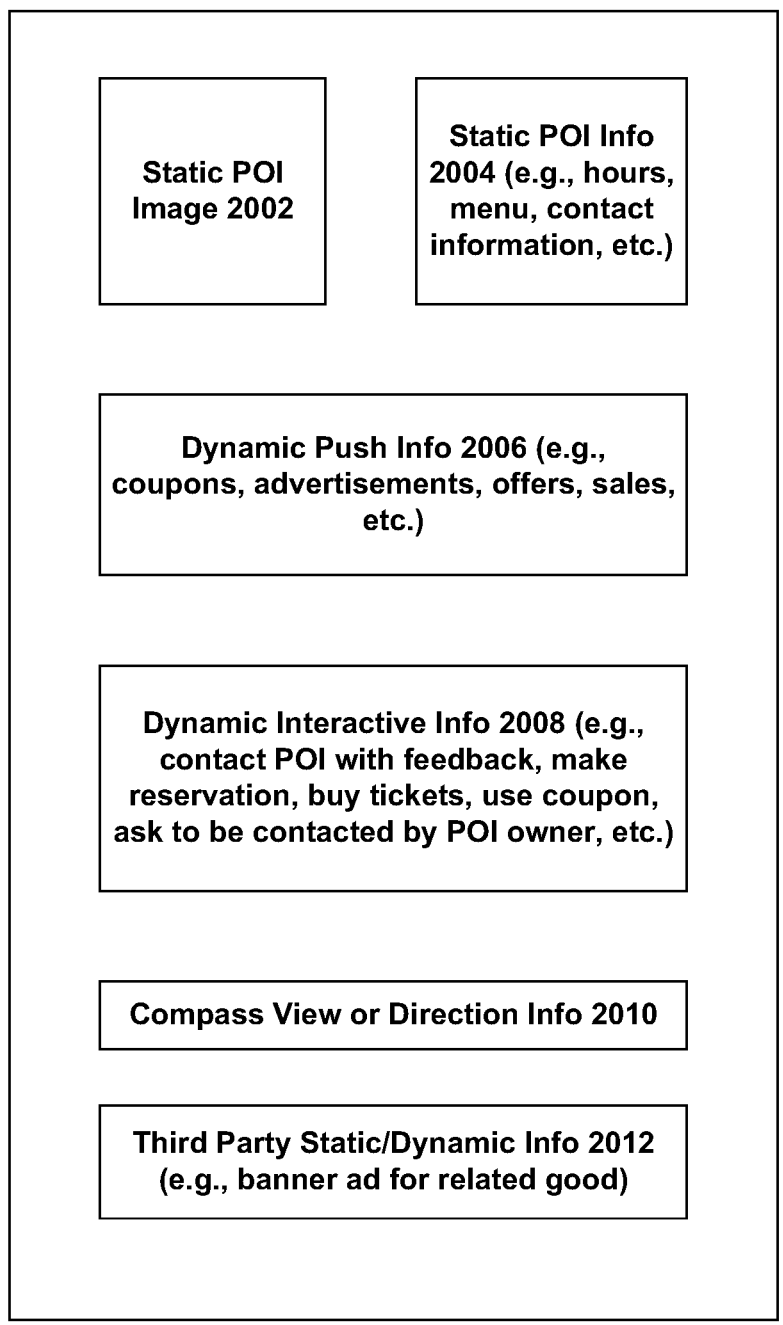
FIG. 20 represents some exemplary, non-limiting fields or user interface windows for displaying static and dynamic information about a given point of interest.

For instance, a set of different choices are shown in FIG. 19. UI 1900 and 1902 illustrate navigation of hierarchical POI information. For instance, level1 categories may include category1, category2, category3, category4 and category5, but if a user selects around the categories with a thumb-wheel, up-down control, or the like, and chooses one such as category2. Then, subcategory1, subcategory2, subcategory3 and subcategory4 are displayed as subcategories of category2. Then, if the user selects, for instance, subcategory4, perhaps few enough POIs, such as buildings 1900 and 1910 are found in the subcategory in order to display on a 2D map UI 1904 along the pointing direction, or alternatively as a 3D virtual map view 1906 along the pointing direction.

Once a single POI is implicated or selected, then a full screen view for the single POI can be displayed, such as the exemplary UI 2000. UI 2000 can have one or more of any of the following representative areas. UI 2000 can include a static POI image 2002 such as a trademark of a store, or a picture of a person. UI 2000 can also include other media, and a static POI information portion 2004 for information that tends not to change such as restaurant hours, menu, contact information, etc. In addition, UI 2000 can include an information section for dynamic information to be pushed to the user for the POI, e.g., coupons, advertisements, offers, sales, etc. In addition, a dynamic interactive information are 2008 can be included where the user can fill out a survey, provide feedback to the POI owner, request the POI to contact the user, make a reservation, buy tickets, etc. UI 2000 also can include a representation of the direction information output by the compass for reference purposes. Further, UI 2000 can include other third party static or dynamic content in area 2012.

When things change from the perspective of either the service or the client, a synchronization process can bring either the client or service, respectively, up to date. In this way, an ecosystem is enabled where a user can point at an object or point of interest, gain information about it that is likely to be relevant to the user, interact with the information concerning the point of interest, and add value to services ecosystem where the user interacts. The system thus advantageously supports both static and dynamic content.

Figure 21:
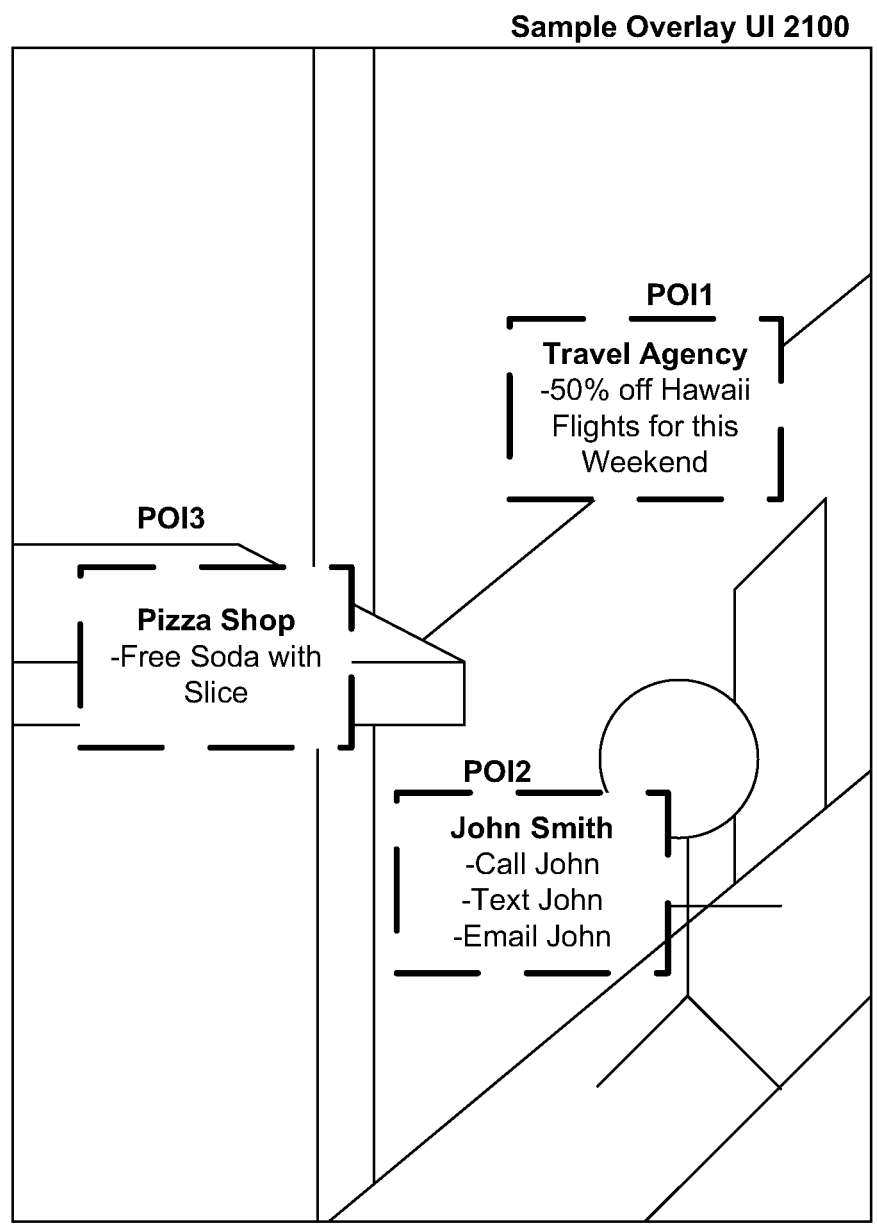
FIG. 21 illustrates a sample overlay user interface for overlaying point of interest information over a camera view of a mobile device.

Other user interfaces can be considered such as left-right, or up-down arrangements for navigating categories or a special set of soft-keys can be adaptively provided.

Where a device includes a camera, in one embodiment shown in FIG. 21, a representative non-limiting overlay UI 2100 is shown having 3 POIs POI1, POI2 and POI3. The POIs are overlaid over actual image data being real time viewed on the device via an LCD screen or like display. The actual image data can be of products on a shelf or other display or exhibit in a store. Thus, as the user aims the camera around his or her environment, the lens becomes the pointer, and the POI information can be overlaid intelligently for discovery of endpoints of interest. Moreover, a similar embodiment can be imagined even without a camera, such as a UI in which 3-D objects are virtually represented based on real geometries known for the objects relative to the user.

Thus, the device UI can be implemented consistent with a camera, or a virtual camera, view for intuitive use of such devices. The pointer mechanism of the device could also switch based on whether the user was currently in live view mode for the camera or not. Moreover, assuming sufficient processing power and storage, real time image processing could discern an object of interest and based on image signatures, overlay POI information over such image in a similar manner to the above embodiments. In this regard, with the device provided herein, a variety of gestures can be employed to zoom in zoom out, perform tilt detection for looking down or up, or panning across a field of view to obtain a range of POIs associated with the panning scope.

With respect to a representative set of user settings, a number or maximum number of desired endpoints delivered as results can be configured. How to filter can also be configured, e.g., 5 most likely, 5 closest, 5 closest to 100 feet away, 5 within category or sub-category, alphabetical order, etc. In each case, based on a pointing direction, implicitly a cone or other cross section across physical space is defined as a scope of possible points of interest. In this regard, the width or deepness of this cone or cross section can be configurable by the user to control the accuracy of the pointing, e.g., narrow or wide radius of points and how far out to search.

To support processing of vector information and aggregating POI databases from third parties, a variety of storage techniques, such as relational storage techniques can be used. For instance, Virtual Earth data can be used for mapping and aggregation of POI data can occur from third parties such as Tele Atlas, NavTeq, etc. In this regard, businesses not in the POI database will want to be discovered and thus, the service provides a similar, but far superior from a spatial relevance standpoint, Yellow Pages experiences where businesses will desire to have their additional information, such as menus, price sheets, coupons, pictures, virtual tours, etc. accessible via the system.

In addition, a synchronization platform or framework can keep the roaming caches in sync, thereby capturing what users are looking at and efficiently processing changes. Or, where a user goes offline, local changes can be recorded, and when the user goes back online, such local changes can be synchronized to the network or service store. Also, since the users are in effect pulling information they care about in the here and in the now through the act of pointing with the device, the system generates high cost per thousand impression (CPM) rates as compared to other forms of demographic targeting. Moreover, the system drives impulse buys, since the user may not be physically present in a store, but the user may be near the object, and by being nearby and pointing at the store, information about a sale concerning the object can be sent to the user.

As mentioned, different location subsystems, such as tower triangulation, GPS, A-GPS, E-GPS, etc. have different tolerances. For instance, with GPS, tolerances can be achieved to about 10 meters. With A-GPS, tolerances can be tightened to about 12 feet. In turn, with E-GPS, tolerance may be a different error margin still. Compensating for the different tolerances is part of the interpretation engine for determining intersection of a pointing vector and a set of points of interest. In addition, a distance to project out the pointing vector can be explicit, configurable, contextual, etc.

In this regard, the various embodiments described herein can employ any algorithm for distinguishing among boundaries of the endpoints, such as boundary boxes, or rectangles, triangles, circles, etc. As a default radius, e.g., 150 feet could be selected, and such value can be configured or be context sensitive to the service provided. On-line real estate sites can be leveraged for existing POI information. Since different POI databases may track different information at different granularities, a way of normalizing the POI data according to one convention or standard can also be implemented so that the residential real estate location data of Zillow can be integrated with GPS information from Starbucks of all the Starbucks by country.

In addition, similar techniques can be implemented in a moving vehicle client that includes GPS, compass, accelerometer, etc. By filtering based on scenarios (e.g., I need gas), different subsets of points of interest (e.g., gas stations) can be determined for the user based not only on distance, but actual time it may take to get to the point of interest. In this regard, while a gas station may be 100 yards to the right off the highway, the car may have already passed the corresponding exit, and thus more useful information to provide is what gas station will take the least amount of time to drive from a current location based on direction/location so as to provide predictive points of interest that are up ahead on the road, and not already aged points of interest that would require turning around from one's destination in order to get to them.

For existing motor vehicle navigation devices, or other conventional portable GPS navigation devices, where a device does not natively include directional means such as a compass, the device can have an extension slot that accommodates direction information from an external directional device, such as a compass. Similarly, for laptops or other portable electronic devices, such devices can be outfitted with a card or board with a slot for a compass. While any of the services described herein can make web service calls as part of the pointing and retrieval of endpoint process, as mentioned, one advantageous feature of a user's locality in real space is that it is inherently more limited than a general Internet search for information. As a result, a limited amount of data can be predictively maintained on a user's device in cache memory and properly aged out as data becomes stale.

In another aspect of any of the embodiments described herein, because stateless messaging is employed, if communications drop with one network, the device can begin further communicating via another network. For instance, a device has two channels, and a user gets on a bus, but no longer have GPRS or GPS activity. Nonetheless the user is able to get the information the device needs from some other channel. Just because a tower, or satellites are down, does not mean that the device cannot connect through an alternative channel, e.g., the bus's GPS location information via Bluetooth.

With respect to exemplary mobile client architectures, a representative device can include, as described variously herein, client Side Storage for housing and providing fast access to cached POI data in the current region including associated dynamically updated or static information, such as annotations, coupons from businesses, etc. This includes usage data tracking and storage. In addition, regional data can be a cached subset of the larger service data, always updated based on the region in which the client is roaming. For instance, POI data could include as a non-limiting example, the following information:

POI coordinates and data //{-70.26322, 43.65412, "STARBUCK'S"}

Localized annotations //Menu, prices, hours of operation, etc

Coupons and ads //Classes of coupons (new user, returning, etc)

Support for different kinds of information (e.g., blob v structured information (blob for storage and media; structured for tags, annotations, etc.)

A device can also include usage data and preferences to hold settings as well as usage data such as coupons "activated," waypoints, businesses encountered per day, other users encountered, etc. to be analyzed by the cloud services for business intelligence analysis and reporting.

A device can also include a continuous update mechanism, which is a service that maintains the client's cached copy of a current region updated with the latest. Among other ways, this can be achieved with a ping-to-pull model that pre-fetches and swaps out the client's cached region using travel direction and speed to facilitate roaming among different regions. This is effectively a paging mechanism for upcoming POIs. This also includes sending a new or modified POI for the region (with annotations+coupons), sending a new or modified annotation for the POIs (with coupons), or sending a new or modified coupon for the POI.

A device can also include a Hardware Abstraction Layer (HAL) having components responsible for abstracting the way the client communicates with the measuring instruments, e.g., the GPS driver for positioning and LOS accuracy (e.g., open eGPS), magnetic compass for heading and rotational information (e.g., gyroscopic), one or more accelerometers for gestured input and tilt (achieves 3D positional algorithms, assuming gyroscopic compass).

As described earlier, a device can also include methods/ interfaces to make REST calls via GPRS/Wi-Fi and a file system and storage for storing and retrieving the application data and settings.

A device can also include user input and methods to map input to the virtual keys. For instance, one non-limiting way to accomplish user input is to have softkeys as follows, though it is to be understood a great variety of user inputs can be used to achieve interaction with the user interfaces of the pointing based services.

SK up/down: //Up and down on choices

SK right, SK ok/confirm: //Choose an option or drill down/next page

SK left, SK cancel/back, //Go back to a previous window, cancel

Exit/Incoming Call events //Exit the app or minimize

In addition, a representative device can include a graphics and windowing stack to render the client side UI, as well as an audio stack to play sounds/alerts.

As mentioned, such a device may also include spatial and math computational components including a set of APIs to perform 3D collision testing between subdivided surfaces such as spherical shells (e.g., a simple hit testing model to adopt and boundary definitions for POIs), rotate points, and cull as appropriate from conic sections.

Figure 22:
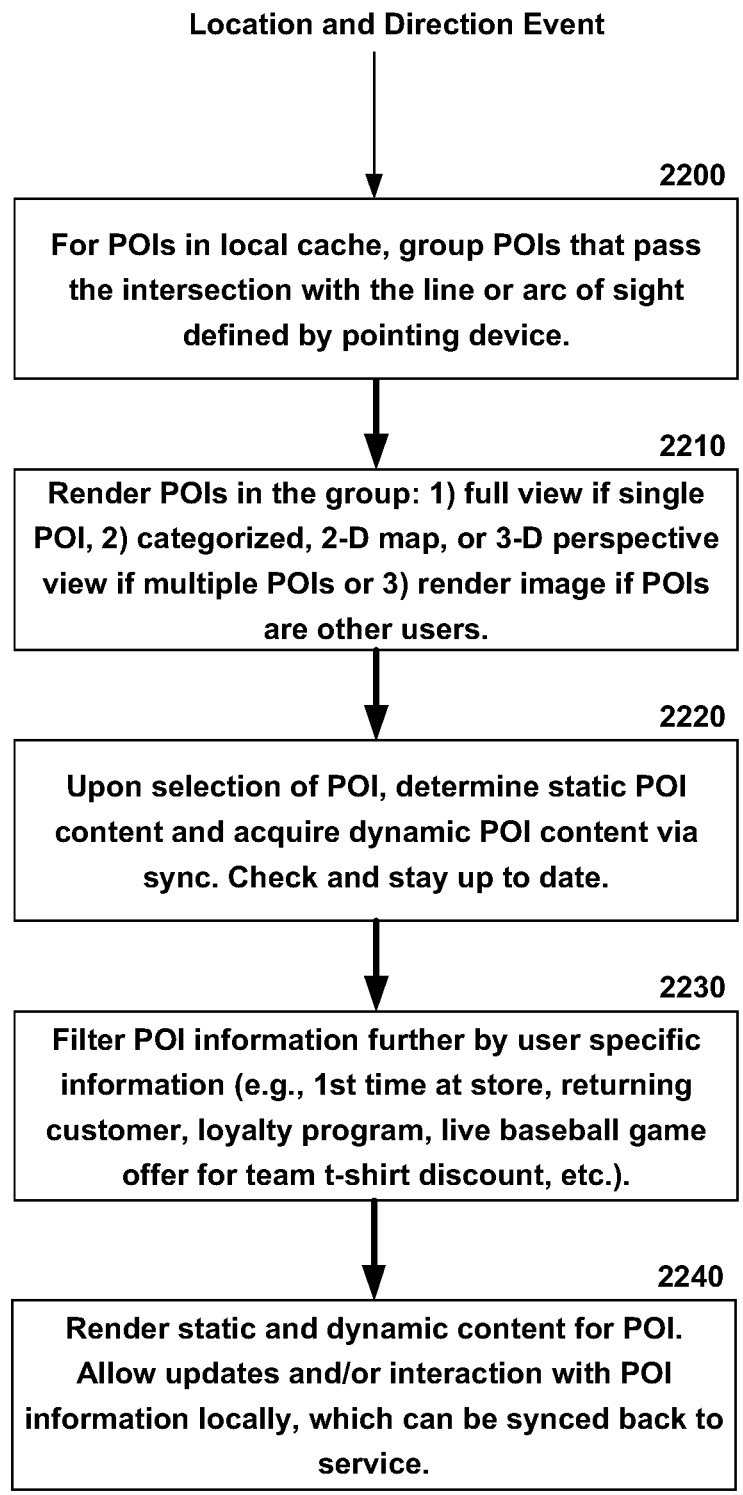
FIG. 22 illustrates a general process for a device upon receiving a location and direction event.

As described in various embodiments herein, FIG. 22 illustrates a process for a device when location (e.g., GPS) and direction (e.g., compass) events occur. Upon the detection of a location and direction event, at 2200, for POIs in the device's local cache, a group of POIs are determined that pass an intersection algorithm for the direction of pointing of the device. At 2210, POIs in the group can be represented in some fashion on a UI, e.g., full view if only 1 POI, categorized view, 2-D map view, 3-D perspective view, or user images if other users, etc. The possibilities for representation are limitless; the embodiments described herein are intuitive based on the general notion of pointing based direction services.

At 2220, upon selection of a POI, static content is determined and any dynamic content is acquired via synchronization. When new data becomes available, it is downloaded to stay up to date. At 2230, POI information is filtered further by user specific information (e.g., if it is the user's first time at the store, returning customer, loyalty program member, live baseball game offer for team clothing discounts, etc.). At 2240, static and dynamic content that is up to date is rendered for the POI. In addition, updates and/or interaction with POI information is allowed which can be synced back to the service.

Exemplary Networked and Distributed Environments

One of ordinary skill in the art can appreciate that the various embodiments of methods and devices for pointing based services and related embodiments described herein can be implemented in connection with any computer or other client or server device, which can be deployed as part of a computer network or in a distributed computing environment, and can be connected to any kind of data store. In this regard, the various embodiments described herein can be implemented in any computer system or environment having any number of memory or storage units, and any number of applications and processes occurring across any number of storage units. This includes, but is not limited to, an environment with server computers and client computers deployed in a network environment or a distributed computing environment, having remote or local storage.

Figure 23:
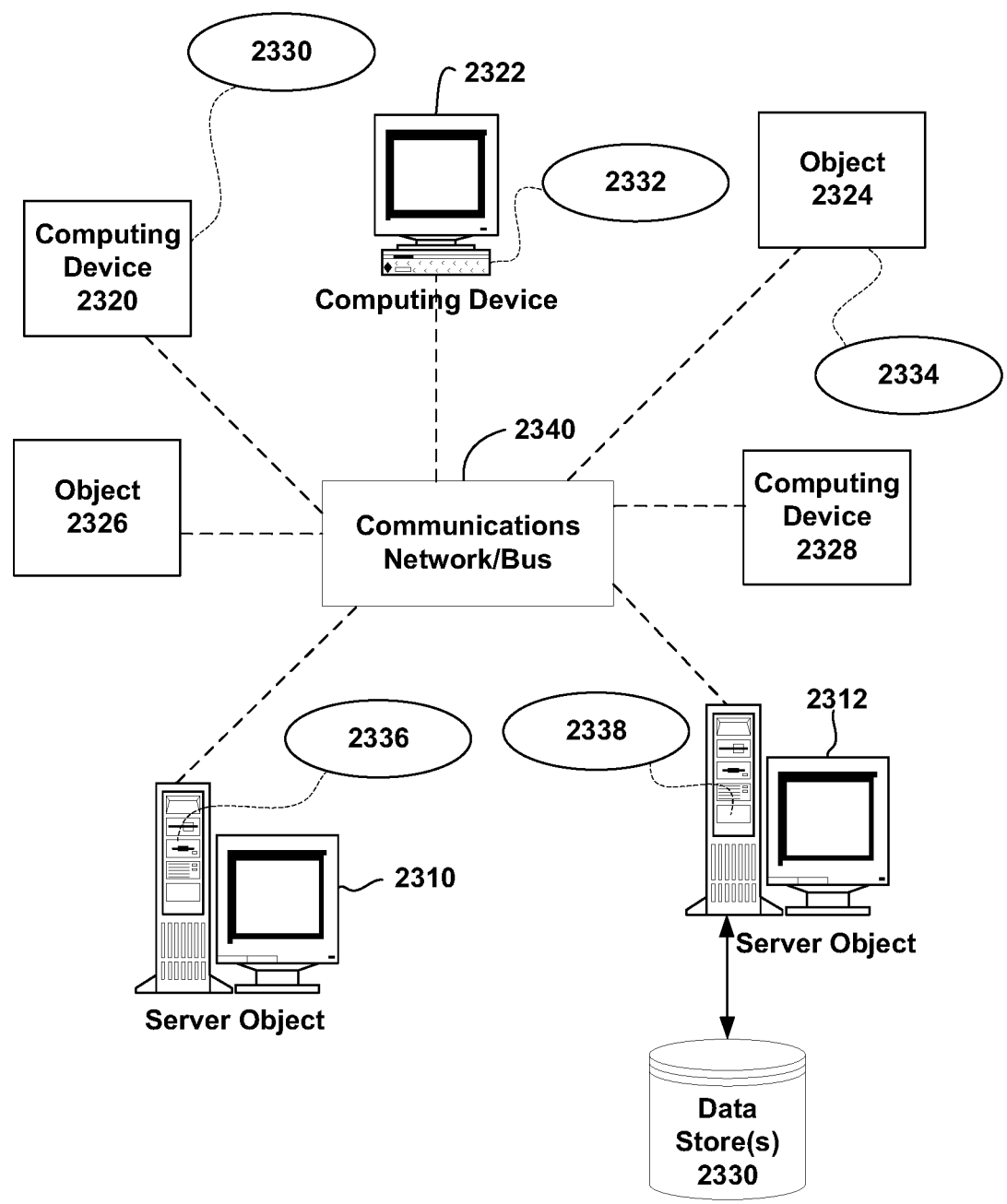
FIG. 23 is a block diagram representing an exemplary non-limiting networked environment in which embodiment(s) may be implemented.

FIG. 23 provides a non-limiting schematic diagram of an exemplary networked or distributed computing environment. The distributed computing environment comprises computing objects 2310, 2312, etc. and computing objects or devices 2320, 2322, 2324, 2326, 2328, etc., which may include programs, methods, data stores, programmable logic, etc., as represented by applications 2330, 2332, 2334, 2336, 2338. It can be appreciated that objects 2310, 2312, etc. and computing objects or devices 2320, 2322, 2324, 2326, 2328, etc. may comprise different devices, such as PDAs, audio/video devices, mobile phones, MP3 players, laptops, etc.

Each object 2310, 2312, etc. and computing objects or devices 2320, 2322, 2324, 2326, 2328, etc. can communicate with one or more other objects 2310, 2312, etc. and computing objects or devices 2320, 2322, 2324, 2326, 2328, etc. by way of the communications network 2340, either directly or indirectly. Even though illustrated as a single element in FIG. 23, network 2340 may comprise other computing objects and computing devices that provide services to the system of FIG. 23, and/or may represent multiple interconnected networks, which are not shown. Each object 2310, 2312, etc. or 2320, 2322, 2324, 2326, 2328, etc. can also contain an application, such as applications 2330, 2332, 2334, 2336, 2338, that might make use of an API, or other object, software, firmware and/or hardware, suitable for communication with or implementation of the predicted interaction model as provided in accordance with various embodiments.

There are a variety of systems, components, and network configurations that support distributed computing environments. For example, computing systems can be connected together by wired or wireless systems, by local networks or widely distributed networks. Currently, many networks are coupled to the Internet, which provides an infrastructure for widely distributed computing and encompasses many different networks, though any network infrastructure can be used for exemplary communications made incident to the techniques as described in various embodiments.

Thus, a host of network topologies and network infrastructures, such as client/server, peer-to-peer, or hybrid architectures, can be utilized. In a client/server architecture, particularly a networked system, a client is usually a computer that accesses shared network resources provided by another computer, e.g., a server. In the illustration of FIG. 23, as a non-limiting example, computers 2320, 2322, 2324, 2326, 2328, etc. can be thought of as clients and computers 2310, 2312, etc. can be thought of as servers where servers 2310, 2312, etc. provide data services, such as receiving data from client computers 2320, 2322, 2324, 2326, 2328, etc., storing of data, processing of data, transmitting data to client computers 2320, 2322, 2324, 2326, 2328, etc., although any computer can be considered a client, a server, or both, depending on the circumstances. Any of these computing devices may be processing data, or requesting services or tasks that may implicate the predicted interaction model and related techniques as described herein for one or more embodiments.

A server is typically a remote computer system accessible over a remote or local network, such as the Internet or wireless network infrastructures. The client process may be active in a first computer system, and the server process may be active in a second computer system, communicating with one another over a communications medium, thus providing distributed functionality and allowing multiple clients to take advantage of the information-gathering capabilities of the server. Any software objects utilized pursuant to the direction based services can be provided standalone, or distributed across multiple computing devices or objects.

In a network environment in which the communications network/bus 2340 is the Internet, for example, the servers 2310, 2312, etc. can be Web servers with which the clients 2320, 2322, 2324, 2326, 2328, etc. communicate via any of a number of known protocols, such as the hypertext transfer protocol (HTTP). Servers 2310, 2312, etc. may also serve as clients 2320, 2322, 2324, 2326, 2328, etc., as may be characteristic of a distributed computing environment.

Exemplary Computing Device

As mentioned, various embodiments described herein apply to any device wherein it may be desirable to perform pointing based services, and predict interactions with points of interest. It should be understood, therefore, that handheld, portable and other computing devices and computing objects of all kinds are contemplated for use in connection with the various embodiments described herein, i.e., anywhere that a device may request pointing based services. Accordingly, the below general purpose remote computer described below in FIG. 24 is but one example, and the embodiments of the subject disclosure may be implemented with any client having network/bus interoperability and interaction.

Although not required, any of the embodiments can partly be implemented via an operating system, for use by a developer of services for a device or object, and/or included within application software that operates in connection with the operable component(s). Software may be described in the general context of computer executable instructions, such as program modules, being executed by one or more computers, such as client workstations, servers or other devices. Those skilled in the art will appreciate that network interactions may be practiced with a variety of computer system configurations and protocols.

Figure 24:
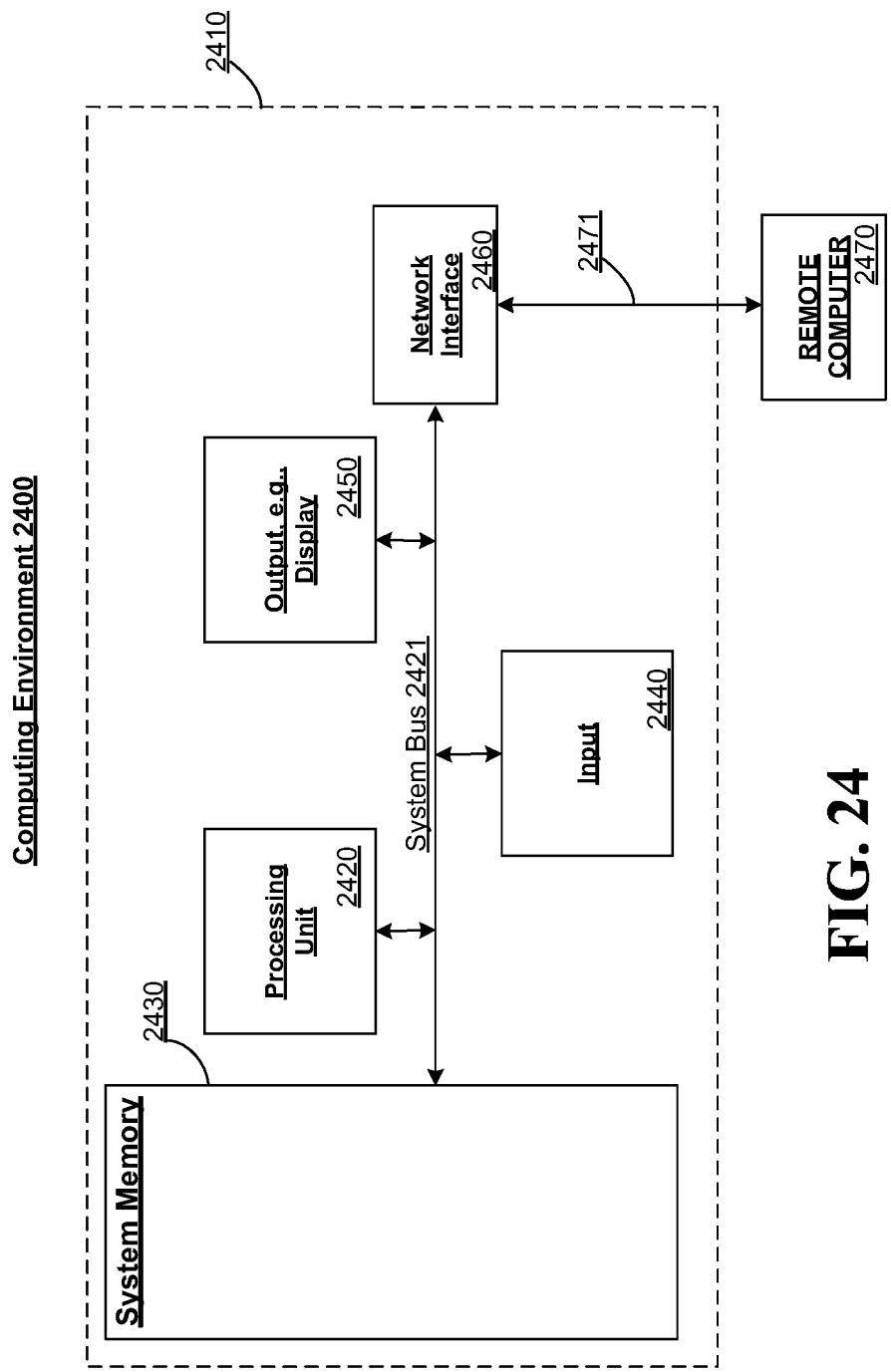
FIG. 24 is a block diagram representing an exemplary non-limiting computing system or operating environment in which aspects of embodiment(s) may be implemented.

FIG. 24 thus illustrates an example of a suitable computing system environment 2400 in which one or more of the embodiments may be implemented, although as made clear above, the computing system environment 2400 is only one example of a suitable computing environment and is not intended to suggest any limitation as to the scope of use or functionality of any of the embodiments. Neither should the computing environment 2400 be interpreted as having any dependency or requirement relating to any one or combination of components illustrated in the exemplary operating environment 2400.

With reference to FIG. 24, an exemplary remote device for implementing one or more embodiments herein can include a general purpose computing device in the form of a handheld computer 2410. Components of handheld computer 2410 may include, but are not limited to, a processing unit 2420, a system memory 2430, and a system bus 2421 that couples various system components including the system memory to the processing unit 2420.

Computer 2410 typically includes a variety of computer readable media and can be any available media that can be accessed by computer 2410. The system memory 2430 may include computer storage media in the form of volatile and/or nonvolatile memory such as read only memory (ROM) and/or random access memory (RAM). By way of example, and not limitation, memory 2430 may also include an operating system, application programs, other program modules, and program data.

A user may enter commands and information into the computer 2410 through input devices 2440 A monitor or other type of display device is also connected to the system bus 2421 via an interface, such as output interface 2450. In addition to a monitor, computers may also include other peripheral output devices such as speakers and a printer, which may be connected through output interface 2450.

The computer 2410 may operate in a networked or distributed environment using logical connections to one or more other remote computers, such as remote computer 2470. The remote computer 2470 may be a personal computer, a server, a router, a network PC, a peer device or other common network node, or any other remote media consumption or transmission device, and may include any or all of the elements described above relative to the computer 2410. The logical connections depicted in FIG. 24 include a network 2471, such local area network (LAN) or a wide area network (WAN), but may also include other networks/buses. Such networking environments are commonplace in homes, offices, enterprise-wide computer networks, intranets and the Internet.

As mentioned above, while exemplary embodiments have been described in connection with various computing devices, networks and advertising architectures, the underlying concepts may be applied to any network system and any computing device or system in which it is desirable to derive information about surrounding points of interest.

There are multiple ways of implementing one or more of the embodiments described herein, e.g., an appropriate API, tool kit, driver code, operating system, control, standalone or downloadable software object, etc. which enables applications and services to use the pointing based services. Embodiments may be contemplated from the standpoint of an API (or other software object), as well as from a software or hardware object that provides pointing platform services in accordance with one or more of the described embodiments. Various implementations and embodiments described herein may have aspects that are wholly in hardware, partly in hardware and partly in software, as well as in software.

The word "exemplary" is used herein to mean serving as an example, instance, or illustration. For the avoidance of doubt, the subject matter disclosed herein is not limited by such examples. In addition, any aspect or design described herein as "exemplary" is not necessarily to be construed as preferred or advantageous over other aspects or designs, nor is it meant to preclude equivalent exemplary structures and techniques known to those of ordinary skill in the art. Furthermore, to the extent that the terms "includes," "has," "contains," and other similar words are used in either the detailed description or the claims, for the avoidance of doubt, such terms are intended to be inclusive in a manner similar to the term "comprising" as an open transition word without precluding any additional or other elements.

As mentioned, the various techniques described herein may be implemented in connection with hardware or software or, where appropriate, with a combination of both. As used herein, the terms "component," "system" and the like are likewise intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on computer and the computer can be a component. One or more components may reside within a process and/or thread of execution and a component may be localized on one computer and/or distributed between two or more computers.

The aforementioned systems have been described with respect to interaction between several components. It can be appreciated that such systems and components can include those components or specified sub-components, some of the specified components or sub-components, and/or additional components, and according to various permutations and combinations of the foregoing. Sub-components can also be implemented as components communicatively coupled to other components rather than included within parent components (hierarchical). Additionally, it should be noted that one or more components may be combined into a single component providing aggregate functionality or divided into several separate sub-components, and any one or more middle layers, such as a management layer, may be provided to communicatively couple to such sub-components in order to provide integrated functionality. Any components described herein may also interact with one or more other components not specifically described herein but generally known by those of skill in the art.

In view of the exemplary systems described supra, methodologies that may be implemented in accordance with the disclosed subject matter will be better appreciated with reference to the flowcharts of the various figures. While for purposes of simplicity of explanation, the methodologies are shown and described as a series of blocks, it is to be understood and appreciated that the claimed subject matter is not limited by the order of the blocks, as some blocks may occur in different orders and/or concurrently with other blocks from what is depicted and described herein. Where non-sequential, or branched, flow is illustrated via flowchart, it can be appreciated that various other branches, flow paths, and orders of the blocks, may be implemented which achieve the same or a similar result. Moreover, not all illustrated blocks may be required to implement the methodologies described hereinafter.

While the various embodiments have been described in connection with the preferred embodiments of the various figures, it is to be understood that other similar embodiments may be used or modifications and additions may be made to the described embodiment for performing the same function without deviating therefrom. Still further, one or more aspects of the above described embodiments may be implemented in or across a plurality of processing chips or devices, and storage may similarly be effected across a plurality of devices. Therefore, the present invention should not be limited to any single embodiment, but rather should be construed in breadth and scope in accordance with the appended claims.

What is claimed is:

1. A mobile device comprising:
   a location subsystem;
   a processor;
   a memory component comprising a cache, and
   a data store having stored instructions which, when executed by the processor, cause the mobile device to manage the memory component and point of interest information stored on the memory component, the stored instructions further being configured to cause the mobile device to perform the following:
   the mobile device detecting position information with the location subsystem as a function of a position of the mobile device;

the mobile device detecting a speed of the mobile device;

the mobile device identifying point of interest information for a plurality of points of interest stored in the memory component;

the mobile device selecting one or more points of interest from the plurality of points of interest to make ready for presentation to a user according to a calculated proximity of the mobile device to the one or more points of interest;

the mobile device presenting point of interest information for the selected one or more point of interest; and the mobile device automatically removing the point of interest information from the cache in response to determining that the point of interest information is no longer relevant based at least in part on the detected speed of the mobile device.

2. The mobile device of claim 1, wherein the mobile device comprises a vehicle navigation device.

3. The mobile device of claim 1, wherein the mobile device is contained in a motorized vehicle.

4. The mobile device of claim 1, wherein the selecting the one or more points of interest from the plurality of points of interest includes filtering out a subset of points of interest based on a determined time it is anticipated for the mobile device to reach the subset of points of interest.

5. The mobile device of claim 1, wherein the selecting the one or more points of interest from the plurality of points of interest includes selecting the one or more points of interest based on a determined time it is anticipated for the mobile device to reach the one or more of points of interest.

6. The mobile device of claim 1, wherein the mobile device selects different points of interest for different detected speeds at a same detected position.

7. A mobile device comprising:
a location subsystem;
a processor;
a memory component comprising a cache, and
a data store having stored instructions which, when executed by the processor, cause the mobile device to manage the memory component and point of interest information stored on the memory component, the stored instructions further being configured to cause the mobile device to perform the following:
the mobile device detecting position information with the location subsystem as a function of a position of the mobile device;
the mobile device detecting a speed of the mobile device;
the mobile device identifying point of interest information for a plurality of points of interest stored in the memory component;
based on the detected speed and the detected position selecting a point of interest from the plurality of points of interest to make ready for presentation to a user;
the mobile device presenting point of interest information for the selected one or more point of interest; and
the mobile device automatically removing the point of interest information from the cache in response to determining that the point of interest information is no longer relevant based at least in part on the detected speed of the mobile device.

8. The mobile device of claim 7, wherein the mobile device comprises a vehicle navigation device.

9. The mobile device of claim 7, wherein the mobile device is contained in a motorized vehicle.

10. The mobile device of claim 7, wherein the selecting the one or more points of interest from the plurality of points of interest includes filtering out a subset of points of interest based on a determined time it is anticipated for the mobile device to reach the subset of points of interest.

11. The mobile device of claim 7, wherein the selecting the one or more points of interest from the plurality of points of interest includes selecting the one or more points of interest based on a determined time it is anticipated for the mobile device to reach the one or more of points of interest.

12. A mobile device comprising:
a location subsystem;
a processor;
a memory component comprising a cache, and
a data store having stored instructions which, when executed by the processor, cause the mobile device to manage the memory component and point of interest information stored on the memory component, the stored instructions further being configured to cause the mobile device to perform the following:
the mobile device detecting position information with the location subsystem as a function of a position of the mobile device;
the mobile device detecting a speed of the mobile device;
the mobile device identifying point of interest information for one or more point of interest stored in the memory component;
the mobile device, based on the detected speed of the mobile device, selecting point of interest information for presentation to a user for the one or more point of interest;
the mobile device presenting point of interest information for the selected one or more point of interest; and
the mobile device dynamically updating the point of interest information in the cache that is associated with the one or more point of interest based at least in part on the detected speed of the mobile device that is detected by the mobile device.

13. The mobile device of claim 12, wherein the mobile device updates the point of interest information associated with the one or more point of interest in response to detecting a change in the detected speed of the mobile device.

14. The mobile device of claim 13, wherein the mobile device removes the point of interest information in the cache when the point of interest information is no longer relevant based at least in part on a detected speed of the vehicle.

15. The mobile device of claim 12, wherein the mobile device comprises a vehicle navigation device.

16. The mobile device of claim 12, wherein the mobile device is contained in a motorized vehicle.

17. The mobile device of claim 12, wherein the mobile device caches the point of interest information in a cache on the mobile device.

* * * * *